United States Patent
Tofte et al.

(10) Patent No.: US 10,145,684 B1
(45) Date of Patent: Dec. 4, 2018

(54) ACCIDENT RECONSTRUCTION IMPLEMENTING UNMANNED AERIAL VEHICLES (UAVS)

(71) Applicant: STATE FARM MUTUAL AUTOMOBILE INSURANCE COMPANY, Bloomington, IL (US)

(72) Inventors: Nathan L. Tofte, Downs, IL (US); Timothy W. Ryan, Hudson, IL (US); Nathan W. Baumann, Bloomington, IL (US); Michael Shawn Jacob, Le Roy, IL (US); Joshua David Lillie, Bloomington, IL (US); Brian N. Harvey, Bloomington, IL (US); Roxane Lyons, Chenoa, IL (US); Rosemarie Geier Grant, Ellsworth, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 573 days.

(21) Appl. No.: 14/858,038

(22) Filed: Sep. 18, 2015

Related U.S. Application Data

(60) Provisional application No. 62/209,963, filed on Aug. 26, 2015, provisional application No. 62/209,755, (Continued)

(51) Int. Cl.
*G06Q 40/00* (2012.01)
*G01C 11/02* (2006.01)
(Continued)

(52) U.S. Cl.
CPC ............. *G01C 11/02* (2013.01); *G06Q 40/08* (2013.01); *G06T 7/0046* (2013.01); *G06T 11/60* (2013.01);
(Continued)

(58) Field of Classification Search
CPC ....................................... G06Q 40/00
(Continued)

(56) References Cited

U.S. PATENT DOCUMENTS

| 8,346,578 B1 * | 1/2013 | Hopkins, III | G06Q 40/00 382/100 |
| 8,650,106 B1 * | 2/2014 | Hopkins, III | G06Q 40/08 705/35 |

(Continued)

OTHER PUBLICATIONS

U.S. Appl. No. 14/510,307, filed Oct. 9, 2014.
(Continued)

*Primary Examiner* — Kirsten S Apple
(74) *Attorney, Agent, or Firm* — Marshall, Gerstein & Borun LLP; Randall G. Rueth

(57) ABSTRACT

Unmanned aerial vehicles (UAVs) may facilitate the generation of a virtual reconstruction model of a vehicle collision. UAVs may collect data (including images) related to the vehicle collision, such as with the insured's permission, which may be received by an external computing device associated with the insurer and utilized to perform a photogrammetric analysis of the images to determine vehicle impact points, the road layout at the scene of the collision, the speeds and directions of vehicles, etc. This data may be used to generate a virtual reconstruction model of the vehicle collision. An insurer may use the virtual reconstruction model to perform various insurance-related tasks, such as allocating fault to drivers or autonomous vehicles involved in the vehicle collision, and adjustment of insurance pricing based upon the fault allocation. As a result, innocent drivers or vehicles may not be unfairly penalized for vehicle collisions not their fault.

21 Claims, 5 Drawing Sheets

Related U.S. Application Data filed on Aug. 25, 2015, provisional application No. 62/209,627, filed on Aug. 25, 2015, provisional application No. 62/208,201, filed on Aug. 21, 2015, provisional application No. 62/207,421, filed on Aug. 20, 2015, provisional application No. 62/207,127, filed on Aug. 19, 2015, provisional application No. 62/053,519, filed on Sep. 22, 2014.

(51) Int. Cl.

| | | |
|---|---|---|
| *G06T 7/00* | (2017.01) | |
| *G06T 11/60* | (2006.01) | |
| *G06T 17/05* | (2011.01) | |
| *G06Q 40/08* | (2012.01) | |

(52) U.S. Cl.
CPC .... *G06T 17/05* (2013.01); *G06T 2207/10032* (2013.01); *G06T 2207/30232* (2013.01); *G06T 2215/16* (2013.01)

(58) Field of Classification Search
USPC .......................................................... 703/38
See application file for complete search history.

(56) References Cited

U.S. PATENT DOCUMENTS

| | | | |
|---|---|---|---|
| 8,818,572 B1 | 8/2014 | Tofte et al. | |
| 9,129,355 B1 | 9/2015 | Harvey et al. | |
| 9,505,494 B1* | 11/2016 | Marlow | B64C 39/024 |
| 9,563,201 B1* | 2/2017 | Tofte | G05D 1/0038 |
| 9,612,598 B2* | 4/2017 | Schultz | G05D 1/0094 |
| 9,691,103 B1* | 6/2017 | Hopkins, III | G06Q 40/08 |
| 9,870,609 B2* | 1/2018 | Kompalli | G06T 7/0002 |
| 9,875,509 B1* | 1/2018 | Harvey | G06Q 40/08 |
| 9,894,327 B1* | 2/2018 | Jacob | H04N 7/185 |
| 2009/0265193 A1 | 10/2009 | Collins et al. | |
| 2014/0019166 A1 | 1/2014 | Swanson et al. | |
| 2014/0100889 A1 | 4/2014 | Tofte | |
| 2014/0316614 A1* | 10/2014 | Newman | G06Q 30/0611 |
| | | | 701/3 |
| 2014/0320651 A1 | 10/2014 | McClatchie et al. | |
| 2015/0363717 A1* | 12/2015 | Lim | G06Q 10/0633 |
| | | | 705/4 |
| 2016/0063642 A1* | 3/2016 | Luciani | G06Q 40/08 |
| | | | 705/4 |
| 2017/0352100 A1* | 12/2017 | Shreve | G06Q 40/08 |

OTHER PUBLICATIONS

U.S. Appl. No. 14/510,492, filed Oct. 9, 2014.
U.S. Appl. No. 14/510,536, filed Oct. 9, 2014.
U.S. Appl. No. 14/808,502, filed Jul. 24, 2015.
U.S. Appl. No. 14/858,034, filed Sep. 18, 2015.
U.S. Appl. No. 14/858,052, filed Sep. 18, 2015.
U.S. Appl. No. 14/858,058, filed Sep. 18, 2015.
U.S. Appl. No. 14/858,075, filed Sep. 18, 2015.
U.S. Appl. No. 14/858,699, filed Sep. 18, 2015.
U.S. Appl. No. 14/858,073, filed Sep. 18, 2015.
U.S. Appl. No. 14/858,076, filed Sep. 18, 2015.
U.S. Appl. No. 14/824,859, filed Aug. 12, 2015.

\* cited by examiner

ACCIDENT RECONSTRUCTION IMPLEMENTING UNMANNED AERIAL VEHICLES (UAVS)

CROSS REFERENCE TO RELATED APPLICATIONS

This application claims the benefit of (1) U.S. Provisional Patent Application No. 62/053,519, entitled "Method of Implementing Unmanned Aerial Vehicles (UAVs)," filed Sep. 22, 2014, (2) U.S. Provisional Patent Application No. 62/209,963, entitled "Disaster Damage Analysis and Loss Mitigation Implementing Unmanned Aerial Vehicles (UAVs)," filed Aug. 26, 2015, (3) U.S. Provisional Patent Application No. 62/207,421 entitled "Insurance Underwriting and Re-Underwriting Implementing Unmanned Aerial Vehicles (UAVs)," filed Aug. 20, 2015, (4) U.S. Provisional Patent Application No. 62/207,127 entitled "Accident Reconstruction Implementing Unmanned Aerial Vehicles (UAVs)," filed Aug. 19, 2015, (5) U.S. Provisional Patent Application No. 62/209,755 entitled "Systems and Methods of Utilizing Unmanned Aerial Vehicles to Detect Insurance Claim Buildup," filed Aug. 25, 2015, (6) U.S. Provisional Patent Application No. 62/209,627 entitled "Systems and Methods for Using Data Collected from Unmanned Aerial Vehicles to Pre-Generate Claims for Insured Approval," filed Aug. 25, 2015, and (7) U.S. Provisional Patent Application No. 62/208,201 entitled "Loss Mitigation Implementing Unmanned Aerial Vehicles (UAVs)," filed Aug. 21, 2015, the disclosure of each of which is hereby expressly incorporated by reference herein in its entirety.

This application is also related to U.S. Nonprovisional patent application Ser. No. 14/824,859 entitled "Accident Fault Determination Implementing Unmanned Aerial Vehicles (UAVs)," filed Aug. 12, 2015, the disclosure of which is hereby expressly incorporated by reference herein in its entirety.

FIELD OF THE DISCLOSURE

The present embodiments relate generally to applications of unmanned aerial vehicles (UAVs). More specifically, the present embodiments relate to using data collected by one or more UAVs to reconstruct an accident such as a vehicle collision or crash or crash.

BACKGROUND

Conventionally, allocating the fault for a vehicle collision or crash may involve an arduous and time-consuming manual process that requires a large component of human intervention. Accident reconstruction may be utilized to help determine what happened during a vehicle collision or crash, but requires data that may require considerable effort to obtain, such as speaking with witnesses, visiting the scene of the vehicle collision or crash, and examining vehicle damage.

The present embodiments may overcome these and/or other deficiencies.

BRIEF SUMMARY

Methods, systems, apparatus, and non-transitory computer-readable media are described that leverage the use of one or more unmanned aerial vehicles (UAVs, or "drones") to facilitate one or more insurance-related tasks. In various embodiments, one or more UAVs may actively survey an area or be dispatched to the scene of a vehicle collision or crash, which may occur manually or as part of an automated or semi-automated process. Once at the scene of the vehicle collision or crash, one or more UAVs may collect data related to the vehicle collision or crash, such as vehicle data, insurer data, images, video, weather conditions, audio and/or recorded statements given by witnesses and/or other persons associated with the vehicle collision or crash, etc.

The one or more UAV's may transmit this data to an external computing device as drone data, which may be associated with an insurer and/or utilized by the insurer to generate a virtual reconstruction model of the vehicle collision or crash. The external computing device may perform a photogrammetric analysis of images associated with the vehicle collision or crash to determine vehicle impact points, the road layout at the scene of the collision, the speeds and directions of vehicles, etc., which may be used to generate the virtual reconstruction model of the vehicle collision or crash. An insurer may use the virtual reconstruction model to perform various insurance-related tasks, such as the allocation of fault to drivers involved in the vehicle collision or crash, adjustment of insurance pricing based upon the fault allocation, using the fault allocation to modify a premium price, update qualified discounts, etc.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The figures described below depict various aspects of the system and methods disclosed herein. It should be understood that each figure depicts an aspect of a particular aspect of the disclosed system and methods, and that each of the figures is intended to accord with a possible aspect thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and instrumentalities shown, wherein.

DETAILED DESCRIPTION

I. System Overview

Figure 1:
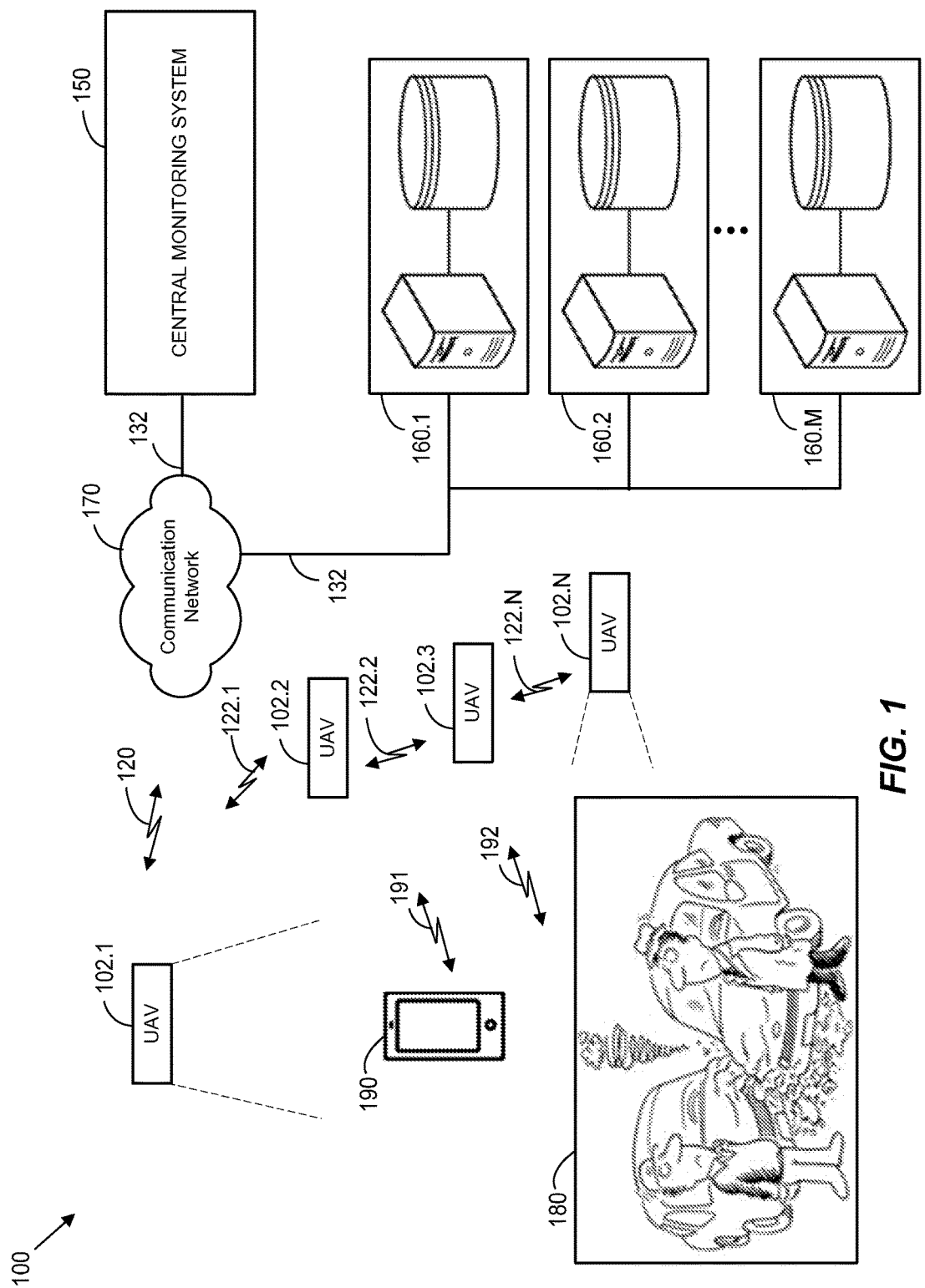
FIG. 1 illustrates an exemplary block diagram of a UAV data collection system 100.

FIG. 1 illustrates an exemplary block diagram of a UAV data collection system 100. UAV data collection system 100 may include any suitable number N of UAVs 102.1-102.N, a central monitoring system 150, any suitable number M of external computing devices 160.1-160.M, a communication network 170, the scene of a vehicle collision or crash 180, and one or more mobile computing devices 190. UAV data collection system 100 may include additional, fewer, or alternate components, including those discussed elsewhere herein.

In various aspects, any suitable number of UAVs 102.1-102.N may communicate with one another and/or with communication network 170. One or more of UAVs 102.1-102.N may receive commands from other UAVs 102 and/or via communication network 170, process these commands, and execute one or more actions based upon these received commands. One or more of UAVs 102.1-102.N may also transmit data to other UAVs 102.1-102.N and/or to communication network 170.

As is further discussed below, by nature of the connectivity of central monitoring system 150 and external computing devices 160.1-160.M to communication network 170, UAVs 102.1-102.N, central monitoring system 150, external computing devices 160.1-160.M, and/or mobile computing device 190 may communicate with one another. For example, UAV 102.1 may communicate with communication network 170 via wireless link 120, while central monitoring system 150 and external computing devices 160.1-160.M may communicate with communication network 170, and one another, via wired links 132. To provide another example, mobile computing device 190 may communicate with communication network 170 via wireless link 191 to send data to and receive data from other devices, such as UAVs 102.1-102.N, central monitoring system 150, and/or external computing devices 160.1-160.M, for example, directly and/or via communication network 170. To provide yet another example, one or more vehicles may communicate with communication network 170 via wireless link 192 to send telematics data to other devices, such as UAVs 102.1-102.N, central monitoring system 150, external computing devices 160.1-160.M, and/or mobile computing device 190, for example, directly and/or via communication network 170.

Communications between UAVs 102.1-102.N, central monitoring system 150, external computing devices 160.1-160.M, and/or mobile computing device 190 may occur with or without communications via communication network 170, in some aspects. For example, UAVs 102.1-102.N may communicate with one another directly via wireless links 122.1-122.N, as shown in FIG. 1.

In various aspects, communications between one or more of UAVs 102.1-102.N, central monitoring system 150, one or more of external computing devices 160.1-160.M, and/or mobile computing device 190 may occur in accordance with any suitable number and/or type of communication protocols, which may be wireless communication protocols, wired communication protocols, or any combination thereof. Furthermore, in various aspects, UAVs 102.1-102.N, central monitoring system 150, external computing devices 160.1-160.M, and/or mobile computing device 190 may communicate with one another and/or with communication network 170 using the same or different types of communication protocols.

For example, one or more of UAVs 102.1-102.N may communicate with one another using a short-range wireless communication protocol, such as Wi-Fi protocol, but communicate with communication network 170, and hence with central monitoring system 150 and/or external computing devices 160.1-160.M, via a cellular protocol. To provide another example, central monitoring system 150 and/or external computing devices 160.1-160.M may communicate with communication network 170, and hence with one another, via an Ethernet protocol.

In some aspects, one or more of UAVs 102.1-102.N may communicate with one another to perform tasks as an intelligent group, thereby acting as and communicating with one another as a drone swarm. In other aspects, one or more of UAVs 102.1-102.N may be controlled individually by other UAVs 102.1-102.N, by central monitoring system 150, by one or more external computing devices 160.1-160.M, and/or mobile computing device 190. Individual control of one or more of UAVs 102.1-102.N may be implemented, for example, via a unique UAV address, a unique frequency channel, a unique code (e.g., a pseudo noise code (PN code) or a pseudo random noise code (PRN code), etc.

As will further discussed below, one or more UAVs 102.1-102.N may execute any suitable action based upon a particular application and/or command that is received by one or more UAVs 102.1-102.N and/or execute any suitable action autonomously or semi-autonomously. For example, one or more UAVs 102.1-102.N may take aerial pictures or collect sensory data associated with the scene of vehicle collision or crash 180, navigate to the scene of vehicle collision or crash 180 to perform various actions, facilitate interaction with a person associated with the scene of vehicle collision or crash 180, collect driver and/or vehicle information, collect images, telematics data, video, audio, etc.

In various aspects, one or more UAVs 102.1-102.N may be implemented as any suitable type of UAV. For example, one or more UAVs 102.1-102.N may be equipped with any suitable number of propellers, wings, and/or engines to facilitate sustained flight, maneuvering, and/or the execution of various tasks as further discussed herein. For example, one or more UAVs 102.1-102.N may be implemented as multi-rotor, fixed wing, etc., and may utilize any suitable type of navigation and/or maneuvering control, such as collision-avoidance systems, detect-and-avoid systems, etc.

Communication network 170 may include any appropriate combination of wired and/or wireless communication networks. Communication network 170 is shown in FIG. 1 as a single network for purposes of brevity, but may represent more than one type of network and/or an aggregation of several networks.

For example, communication network 170 may include any combination of satellites, a local area network (LAN), a metropolitan area network (MAN), a wide area network (WAN), public switched telephone networks (PSTN), Wireless Fidelity (WiFi), etc., and may facilitate a connection to the Internet for one or more devices communicatively coupled thereto. To provide further examples, communication network 170 may include wired telephone and/or cable hardware, satellite, cellular phone communication networks, etc.

Central monitoring system 150 may be implemented as any suitable device configured to communicate with, command, and/or control one or more UAVs 102.1-102.N. Furthermore, central monitoring system 150 may be implemented as any suitable device configured to receive data from one or more UAV's 102.1-102.N, and to share this data or otherwise make this data available to central monitoring system 150 and/or one or more external computing devices 160.1-160.M.

In some aspects, central monitoring system 150 may be configured to communicate with, command, and/or control one or more UAVs 102.1-102.N individually or in accordance with a UAV swarm protocol. For example, UAVs 102.1-102.N may include a hierarchy of UAVs in which some of UAVs 102.1-102.N may act as "mothership" UAVs and exert control over other UAVs. Aspects include central monitoring system 150 communicating with, commanding, and/or controlling one or more of UAVs 102.1-102.N in accordance with any suitable combination of direct control and/or swarm control techniques.

In various aspects, central monitoring system 150 may be implemented as, for example, one or more computers, laptops, mobile devices such as a smartphones, tablet computers, netbooks, notebooks, phablets, wearable electronic devices, smart glasses, etc. In one aspect, central monitoring system 150 may be implemented as one or more specialized components configured to monitor and/or control one or more UAVs 102.1-102.N. For example, central monitoring system 150 may be implemented as a computerized system configured to dispatch one or more UAVs 102.1-102.N, to command one or more UAVs 102.1-102.N to perform various data collection tasks, to navigate one or more UAVs 102.1-102.N to a specific geographic location for repairs, recharging, and/or refueling, etc.

In some aspects, central monitoring system 150 may function automatically or semi-automatically with no user intervention or minimal user intervention, respectively. For example, central monitoring system 150 may be implemented with one or more computing devices that are programmed to receive instructions from mobile computing device 190 and/or one or more external computing devices 160.1-160.M, and to command, control, and/or communicate with one or more UAVs 102.1-102.N based upon these instructions.

In other aspects, central monitoring system 150 may be staffed with personnel trained to command, control, and/or communicate with one or more UAVs 102.1-102.N based upon a particular scenario or application. For example, a driver at the scene of vehicle collision or crash 180 may call or otherwise report (e.g., via mobile computing device 190) that she was involved in a vehicle collision or crash. Trained personnel may utilize one or more computing devices implemented by central monitoring system 150 to dispatch one or more UAVs 102.1-102.N to the scene of the vehicle collision or crash 180 to collect data, to receive data from one or more UAVs 102.1-102.N, to make this data available to one or more external computing devices 160.1-160.M for accident reconstruction and/or insurance-related purposes, etc.

One or more computing devices 160.1-160.M may be implemented as any suitable number and/or type of computing devices configured to utilize drone data collected from one or more UAVs 102.1-12.N generate a virtual reconstruction model of the vehicle collision or crash at the scene of the vehicle collision or crash 180, to allocate fault to one or more drivers and/or vehicles involved in the vehicle collision or crash, and/or to facilitate one or more insurance-related tasks using data collected from one or more UAVs 102.1-102.N, the virtual reconstruction model of the vehicle collision or crash, and/or the fault allocation.

For example, one or more computing devices 160.1-160.M may be part of an insurer computing system, and as such may access insurer databases, algorithms, applications, remote servers, remote processors, etc., as needed to perform insurance-related functions. To provide another example, one or more computing devices 160.1-160.M may access traffic video data, weather data, various private and/or municipal surveillance systems access various security monitoring systems, etc.

In various aspects, one or more UAVs 102.1-102.N, central monitoring system 150, one or more computing devices 160.1-160.M, and/or mobile computing device 190 may share one or more functions such that either of one or more UAVs 102.1-102.N, central monitoring system 150, one or more UAVs 102.1-102.N, and/or mobile computing device 190 may perform any portion (or all) of the functions otherwise performed by the other components. Furthermore, functions may be performed by one or more UAVs 102.1-102.N, central monitoring system 150, one or more computing devices 160.1-160.M, and/or mobile computing device 190 working in concert with one another.

For example, as will be further discussed herein, one or more UAVs 102.1-102.N may analyze collected drone data locally or transmit the drone data to central monitoring system 150 and/or one or more of external computing devices 160.1-160.M for further analysis, thereby offloading these tasks.

To provide additional examples, in some aspects, central monitoring system 150 and/or one or more computing devices 160.1-160.M may perform the same functions as one another in some aspects, while performing separate, dedicated functions in other aspects. That is, the command, control, and communication functions performed by central monitoring system 150 may be alternatively or additionally performed by one or more computing devices 160.1-160.M. Furthermore, the accident reconstruction and/or insurance-related functions performed by one or more computing devices 160.1-160.M may be alternatively or additionally performed by central monitoring system 150.

To provide yet another example, one or more of UAVs 102.1-102.N may function as a central monitoring system, performing command, control, and communication functions over other UAVs 102.1-102.N. These aspects may be particularly useful when one or more of UAVs 102.1-102.N is configured to navigate and communicate with one another in accordance with a swarm protocol.

II. Exemplary UAV or Drone

Figure 2:
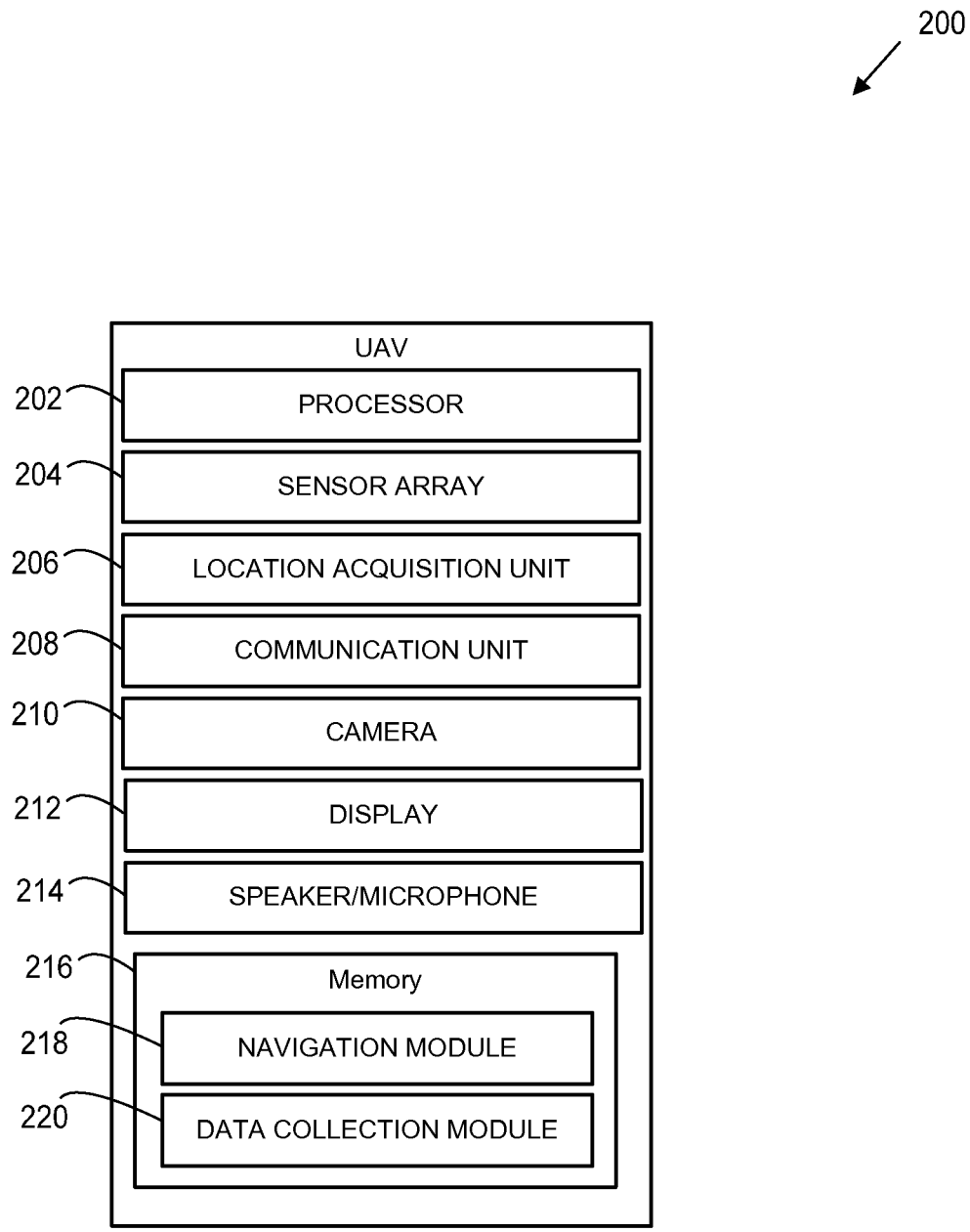
FIG. 2 illustrates an exemplary block diagram of a UAV 200.

FIG. 2 illustrates an exemplary block diagram of a UAV 200. UAV 200 may include a processor 202, a sensor array 204, a location acquisition unit 206, a communication unit 208, a camera 210, a display 212, a speaker/microphone 214, and a memory 216. In one aspect, UAV 200 is an implementation of one of UAVs 102.1-102.N, as shown in FIG. 1. UAV 200 may include additional, fewer, or alternate components, including those discussed elsewhere herein.

Processor 202 may be implemented as any suitable type and/or number of processors, such as a host processor of UAV 200, for example. To provide additional examples, processor 202 may be implemented as an application specific integrated circuit (ASIC), an embedded processor, a central processing unit (CPU) associated with UAV 200, a graphical processing unit (GPU), etc.

Processor 202 may be configured to communicate with one or more of sensor array 204, location acquisition unit 206, communication unit 208, camera 210, display 212, speaker/microphone 214, and/or memory 216 via one or more wired and/or wireless interconnections, such as any suitable number of data and/or address buses, for example. These interconnections are not shown in FIG. 2 for purposes of brevity.

Processor 202 may be configured to operate in conjunction with one or more of sensor array 204, location acquisition unit 206, communication unit 208, camera 210, display 212, speaker/microphone 214, and/or memory 216 to process and/or analyze data, to store data to memory 216, to retrieve data from memory 216, to cause instructions, alerts and/or notifications to be displayed via display 212 and/or to be sounded via speaker/microphone 214, to receive, process, and/or interpret communications, commands, and/or controls received via communication unit 208, to receive, process, store, and/or interpret data measured and/or generated via sensor array 204, to receive, store, and/or transmit images and/or video captured via camera 210, to execute one or more functions related to the navigation of UAV 200, to receive data from and/or send data to one or more devices, such as one or more of vehicles at the scene of a vehicle collision or crash (e.g., reported from their telematics systems), central monitoring system 150, mobile computing device 190, another UAV (e.g., one or more of UAVs 102.1-102.N), one or more of external computing devices 160.1-160.M, etc.

Sensor array 204 may be configured to collect information in accordance with any suitable number of implemented sensors, to store the collected information as drone data in any suitable portion of memory 216, and/or to transmit the drone data to one or more of central monitoring system 150, another UAV (e.g., one or more of UAVs 102.1-102.N), and/or one or more of external computing devices 160.1-160.M.

Sensor array 204 may be implemented as any suitable number and/or type of sensors configured to measure, monitor, and/or quantify one or more characteristics of UAV 200's environment as part of the collected drone data.

Examples of suitable sensor types implemented by sensor array 204 may include one or more accelerometers, gyroscopes, compasses, speedometers, magnetometers, barometers, thermometers, proximity sensors, light sensors (e.g., light intensity detectors), electromagnetic radiation sensors (e.g., infrared and/or ultraviolet radiation sensors), ultrasonic and/or infrared range detectors, humistors, hygrometers, altimeters, microphones, Light Detection and Ranging (LiDAR) sensors, cameras, audio or video recorders, etc. Sensor array 204 may additionally or alternatively include advanced sensors, for example, that detect and/or receive data associated with temperature measurements, thermal imaging, weather conditions, traffic conditions, etc.

Location acquisition unit 206 may be implemented as a satellite navigation receiver that works with a global navigation satellite system (GNSS) such as the global positioning system (GPS) primarily used in the United States, the GLONASS system primarily used in the Soviet Union, the BeiDou system primarily used in China, and/or the Galileo system primarily used in Europe.

Location acquisition unit 206 and/or processor 202 may be configured to receive navigational signals from one or more satellites and to calculate a geographic location of UAV 200 using these signals. Location acquisition unit 206 may include one or more processors, controllers, or other computing devices and memory to calculate the geographic location of UAV 200 without processor 202, or location acquisition unit 206 may utilize components of processor 202. Thus, processor 202 and location determining component 206 may be combined or be separate or otherwise discrete elements.

Although aspects of UAV 200 may include a satellite navigation receiver, any suitable location-determining technology may be used. For example, communication unit 208 may determine the location of UAV 200 by receiving data from transmitter locations and then performing basic triangulation calculations to determine the relative position of UAV 200 with respect to the transmitting locations. For example, cellular towers or any customized transmitting radio frequency towers may be used instead of, or in addition to, satellites.

Communication unit 208 may be configured to support any suitable number and/or type of communication protocols to facilitate communications between UAV 200 and one or more other devices, such as one or more of central monitoring system 150, another UAV (e.g., one or more of UAVs 102.1-102.N), one or more of external computing devices 160.1-160.M, and/or mobile computing device 190, for example, as shown in FIG. 1. Communication unit 208 may be configured to send and receive data directly and/or indirectly (e.g., via communication network 170).

Communication unit 208 may be configured to receive any suitable type of information via one or more of central monitoring system 150, another UAV (e.g., one or more of UAVs 102.1-102.N), one or more of external computing devices 160.1-160.M, and/or mobile computing device 190. Furthermore, communication unit 208 may likewise be configured to transmit any suitable type of information to one or more of central monitoring system 150, another UAV (e.g., one or more of UAVs 102.1-102.N), one or more of external computing devices 160.1-160.M, and/or mobile computing device 190. Communication unit 208 may be implemented with any suitable combination of hardware and/or software to facilitate this functionality. For example, communication unit 208 may be implemented having any suitable number of wired and/or wireless transceivers, ports, connectors, antennas, etc.

Camera 210 may be configured to capture one or more digital images and/or video data. For example, camera 210 may capture, store (e.g., in a suitable portion of memory 216), and/or transmit images associated with the scene of vehicle collision or crash 180, such as images and/or videos of vehicles involved in the vehicle collision or crash, aerial images and/or videos showing a top-down view of the scene of the vehicle collision or crash 180, the road layout, etc. This data may be part of the drone data transmitted to other devices via communication unit 208. In various aspects, camera 210 may include any suitable combination of hardware and/or software such as image sensors, optical stabilizers, image buffers, frame buffers, charge-coupled devices (CCDs), complementary metal oxide semiconductor (CMOS) devices, etc., to facilitate this functionality.

Camera 210 may be coupled to one or more servos that are controlled via processor 202 to obtain images and/or video from one or more locations, such as the scene of the vehicle collision or crash 180, for example, as shown in FIG. 1. Camera 210 may include any suitable number of cameras, which may include cameras that capture image data in both the visible and the non-visible spectrum, such as digital and thermal imaging cameras, for example.

Display 212 may be configured to display one or more images, messages, instructions, etc., in response to data received from processor 202. Display 212 may be implemented as any suitable type of display, and may facilitate user interaction with UAV 200. For example, display 212 may be implemented as a capacitive touch screen display, a resistive touch screen display, a standard display (a non-touch display), etc. In various aspects, display 212 may be configured to work in conjunction with processor 202 to detect user inputs upon a user selecting a displayed interactive icon or other graphic, to identify user selections of objects displayed via display 212, to display instructions and/or prompts to facilitate collecting information and/or images associated with a vehicle collision or crash, etc. Additionally or alternatively, information displayed via display 212 may be in the form of audible announcements made via speaker/microphone 214.

In accordance with various aspects, memory 216 may be a computer-readable non-transitory storage device that may include any suitable combination of volatile memory (e.g., a random access memory (RAM) or non-volatile memory (e.g., battery-backed RAM, FLASH, etc.). Memory 216 may be configured to store instructions executable on processor 202, such as the various memory modules illustrated in FIG. 2 and further discussed below, for example. These instructions may include machine readable instructions that, when executed by processor 202, cause processor 202 to perform various acts as described herein.

Navigation module 218 is a region of memory 216 configured to store instructions that, when executed by processor 202, cause processor 202 to perform various acts in accordance with applicable aspects as described herein.

In one aspect, navigation module 218 may be a portion of memory 216 configured to store instructions, that when executed by processor 202, cause processor 202 to control the speed, direction, route, and/or altitude of UAV 200. For example, executable instructions stored in navigation module 218 may enable processor 202 to determine a destination specified as geographic location coordinates received as part of a command via communication unit 208, to determine a current geographic location of UAV 200 via location acquisition unit 206, and/or to execute the appropriate controls to maneuver UAV 200 to the destination.

To provide another example, navigation module 218 may be a portion of memory 216 configured to store instructions, that when executed by processor 202, cause processor 202 to issue a command to another UAV (e.g., one or more of UAVs 102.1-102.N), thereby causing that UAV to navigate to a particular geographic location.

In some embodiments, navigation of UAV 200 may be performed with the assistance of one or more persons controlling UAV 200. For example, personnel associated with central monitoring system 150 may use image and/or video captured by camera 210 as feedback and manually direct UAV 200. For example, a person may use a controller implemented by central monitoring system 150 that receives control inputs that are interpreted, translated, and transmitted as commands to UAV 200.

In other aspects, navigation may be performed by UAV 200 autonomously or with minimal assistance from one or more persons. For example, executable instructions stored in navigation module 218 may enable processor 202 to utilize image and/or video captured by camera 210 and to analyze the image and/or video in accordance with any suitable image recognition, object recognition, collision-avoidance, detect-and-avoid, and/or machine vision algorithms. UAV 200 may use the outcome of such analyses to complete a requested navigational task.

That is, in manually controlled aspects, UAV 200 may navigate to various locations when being controlled by a person via central monitoring system 150. However, in autonomous or semi-autonomous embodiments, UAV 200 may receive a command of a higher level structure, such as a command requesting UAV 200 to navigate to a particular distance from a vehicle identified in the video (e.g., one that is selected via a user through an appropriate user input gesture), in which case UAV may carry out this task without further user assistance. Data collection module 220 is a region of memory 216 configured to store instructions that, when executed by processor 202, cause processor 202 to perform various acts in accordance with applicable aspects as described herein.

In one aspect, data collection module 220 may be a portion of memory 216 configured to store instructions, that when executed by processor 202, cause processor 202 to collect data associated with one or more locations in which UAV 200 is dispatched or otherwise directed. Similar to the navigation processes described above, UAV 200 may likewise perform data collection processes via manually, autonomously, or semi-autonomously. Again, so the vehicle collision or crash may be later reconstructed, the collected data may include any data suited for that task.

Regardless of how the data is collected, aspects include UAV 200 collecting drone data that is used to perform various tasks such as, for example, accident reconstruction, one or more insurance-related tasks, and/or the allocation of fault or persons or vehicles associated with a vehicle collision or crash. These tasks and how the drone data is used for each of these tasks is further discussed below with reference to FIG. 4. The drone data may be collected, for example, via one or more of sensor array 204, location acquisition unit 206, and/or camera 210.

To provide an illustrative example, UAV 200 may identify, via an object recognition algorithm stored in data collection module 20 and executed by processor 202, one or more vehicles associated with the scene of the vehicle collision or crash 180, which may be identified by correlating UAV 200s current geographic location (determined via location acquisition unit 206) to a geographic locations received in a transmitted command.

Once at the scene of the vehicle collision or crash 180, UAV 200 may capture images and/or video of the vehicles involved in the vehicle collision or crash, which may be of sufficient detail, resolution, and proximity such that impact points, crush distances, license plate numbers, and the extent of vehicle damage may later be adequately assessed by a person and/or via a photogrammetric algorithm used to generate the virtual model of the reconstructed vehicle collision or crash.

Additionally or alternatively, a person controlling UAV 200 may transmit commands via central control system 150, for example to remotely control UAV 200 and collect the desired images for accident reconstruction.

To provide another illustrative example, UAV 200 may be instructed to navigate to the scene of the vehicle collision or crash 180 to collect other images, video, and/or audio data associated with the scene of the vehicle collision or crash 180 as drone data. For example, the images may be aerial images and/or photographs taken above the scene of the vehicle collision or crash 180 at a predetermined or otherwise established elevation (e.g., an elevation determined via changes in barometric pressure determined via sensor array 204, an elevation determined as part of the geographic location determined via location acquisition unit 208, etc.). Aerial images and/or video data may reveal details associated with the scene of the vehicle collision or crash, such as the type of roads, the type of intersection, road lighting conditions, current traffic conditions, the time of day, weather conditions, etc.

To provide another example, UAV 200 may perform interviews with drivers, passengers, witnesses, and/or other persons involved in a vehicle collision or crash. UAV 200 may provide prompts and/or instructions via display 212 and/or speaker/microphone 214, record responses to the prompts as audio and/or video data, instruct persons being interviewed how to respond, store these interviews in a suitable portion of memory 216, and/or transmit these responses to one or more of central monitoring system 150, another UAV (e.g., one or more of UAVs 102.1-102.N), one or more of external computing devices 160.1-160.M, mobile computing device 190, etc.

III. Exemplary Mobile Computing Device

Figure 3:
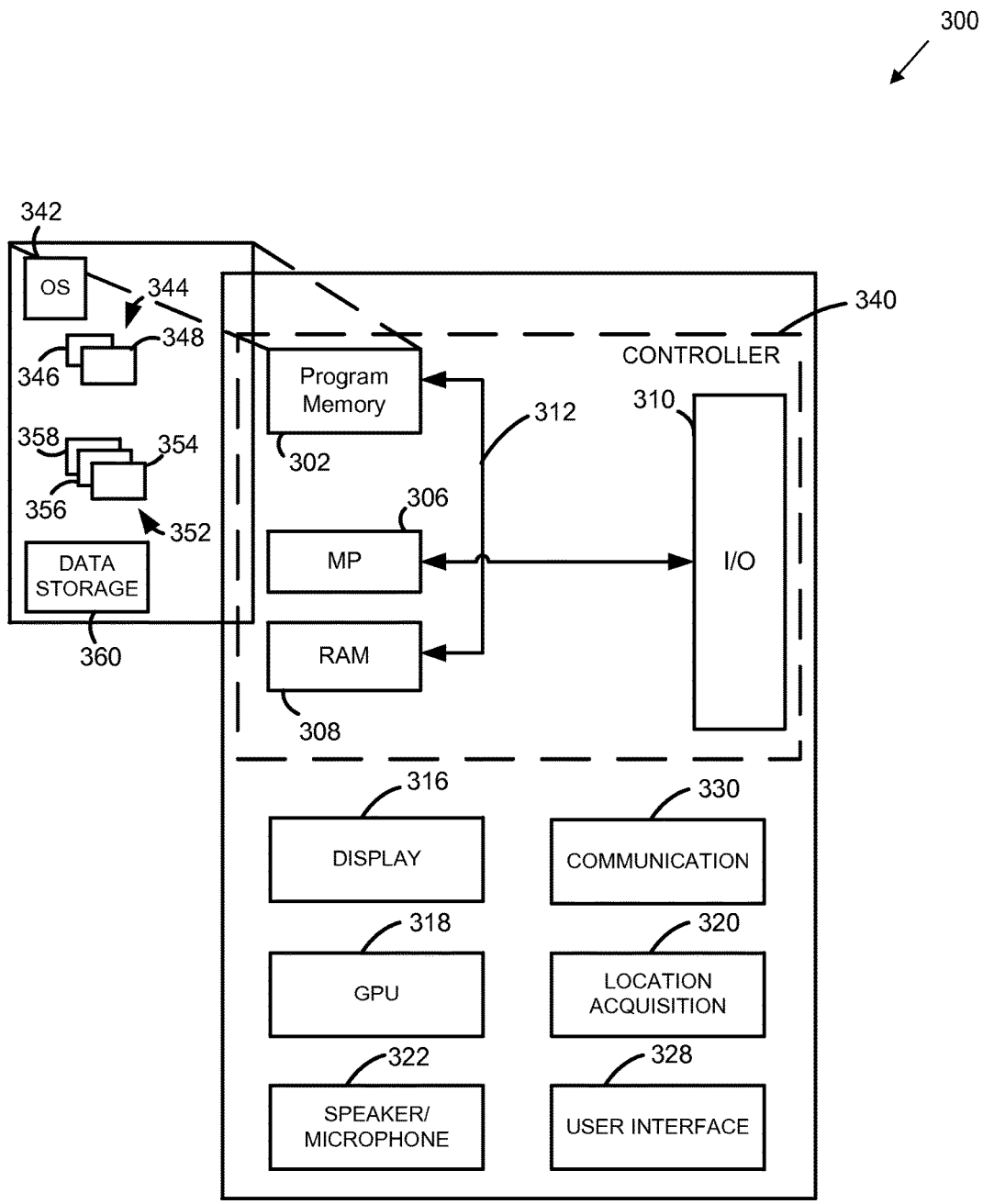
FIG. 3 illustrates an exemplary block diagram of a mobile computing device 300.

FIG. 3 illustrates an exemplary block diagram of a mobile computing device 300. Mobile computing device 300 may be implemented as any suitable computing device. In one aspect, mobile computing device 300 may be associated with a driver, passenger, witness, or other person associated with a vehicle collision or crash. In one aspect, mobile computing device 300 may be an implementation of mobile computing device 190, as shown in FIG. 1.

Mobile computing device 300 may include a controller 340, a display 316, a graphics processing unit (GPU) 318, a location acquisition unit 320, a speaker/microphone 322, a user interface 328, and a communication unit 330. Mobile computing device 300 may include additional, fewer, or alternate components, including those discussed elsewhere herein.

Controller 340 may include a program memory 302, a microprocessor (MP) 306, a random-access memory (RAM) 308, and an input/output (I/O) interface 310, each of which may be interconnected via an address/data bus 312. Controller 340 may be implemented with any suitable type and/or number of processors, such as a host processor of mobile computing device 300, for example. In some aspects, controller 340 may be configured to communicate with additional data storage mechanisms not shown in FIG. 3 for purposes of brevity (e.g., one or more hard disk drives, optical storage drives, solid state storage devices, etc.) that may reside within and/or are otherwise associated with mobile computing device 300.

Program memory 302 may store data used in conjunction with one or more functions performed by mobile computing device 300 to facilitate the interaction between mobile computing device 300 and one or more other devices (e.g., one or more of central monitoring system 150, one or more of UAVs 102.1-102.N, and/or one or more of external computing devices 160.1-160.M). For example, program memory 302 may store one or more programs, applications, algorithms, etc. that, when executed by controller 340, facilitate the interaction between mobile computing device 300 and one or more networks (e.g., communication network 170).

In various aspects, program memory 302 may be implemented as a non-transitory tangible computer readable media configured to store computer-readable instructions that, when executed by controller 340, cause controller 340 to perform various acts. Program memory 302 may include an operating system 342, one or more software applications 344, and one or more software routines 352. To provide another example, program memory 302 may include other portions to store data that may be read from and written to by MP 306, such as data storage 360, for example.

In one aspect, one or more MPs 306 may be configured to execute one or more of software applications 344, software routines 352 residing in program memory 302, and/or other suitable software applications. Operating system 342 may be implemented as any suitable operating system platform depending upon the particular implementation of mobile computing device 300. For example, operating system 342 may be implemented as a mobile OS platform such as the iOS®, Android™, Palm® webOS, Windows® Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively.

In one aspect, data storage 360 may store data such as application data for the one or more software applications 344, routine data for the one or more software routines 352, user logon credentials, received insurance-related information, received insurance policy data, the outcome of an allocated fault determination based upon a reconstructed vehicle collision or crash, etc.

Display 316 may be implemented as any suitable type of display and may facilitate user interaction with mobile computing device 300 in conjunction with user interface 328. For example, display 316 may be implemented as a capacitive touch screen display, a resistive touch screen display, etc. In various aspects, display 316 may be configured to work in conjunction with controller 340 and/or GPU 318 to display one or more fields for user input, to display insurance pricing such as premium quotes, to display the impact of a vehicle collision or crash on the user's insurance policy, to display various details associated with a user's insurance policy such as information associated with the user's insurance profile, etc.

Location acquisition unit 320 may be configured to generate geographic location data utilizing any suitable global positioning techniques. For example, location acquisition unit 320 may communicate with one or more satellites and/or wireless transmitters to determine a location of mobile computing device 300. Location acquisition unit 320 may function independently or in conjunction with one or more components of mobile computing device 300. For example, location acquisition unit 320 may work in conjunction with communication unit 330 to utilize cellular location data received via communications unit 330 and implement "Assisted Global Positioning System" (A-GPS). To provide additional examples, location acquisition unit 318 may work as an independent unit implementing satellite GPS, or any other suitable global positioning protocol (e.g., the GLONASS system operated by the Russian government, the Galileo system operated by the European Union, etc.) to determine a geographic location of mobile computing device 300.

Communication unit 330 may be configured to facilitate communications between mobile computing device 300 and one or more other devices, such as central monitoring system 150, one or more of UAVs 102.1-102.N, one or more of external computing devices 160.1-160.M, etc. In various aspects, mobile computing device 300 may be configured to communicate with these other devices in accordance with any suitable number and/or type of communication protocols. Thus, in various aspects, communication unit 330 may be implemented with suitable hardware, firmware, and/or software to support any suitable number and type of communication protocols in accordance with the various aspects described herein.

Communication unit 330 may be configured to support separate or concurrent communications, which may be the same type of communication protocol or different types of communication protocols. For example, communication unit 330 may be configured to facilitate communications between mobile computing device 300 and one or more backend components (e.g., one or more of central monitoring system 150 and/or external computing devices 160.1-160.M) via a cellular communications protocol while facilitating communications between mobile computing device 300 and one or more UAVs 102.1-102.N via a personal area network communications protocol, a Wi-Fi protocol (e.g., Wi-Fi direct), etc.

Speaker/microphone 322 may be configured as one or more devices. For example, speaker/microphone 322 may include a microphone configured to detect sounds and to convert detected sounds to voce data. This voice data may be stored in any format suitable for voice recognition analysis, for storage in data storage 360, for communications via communications unit 330, etc. Speaker/microphone 322 may additionally or alternatively include a speaker configured to play sounds in response to data received from one or more components of mobile computing device 300 (e.g., controller 340 and/or communication unit 330).

User interface 328 may be implemented as any suitable device configured to collect user input, such as a "soft" keyboard displayed on display 316, a keyboard attached to mobile computing device 300, an external keyboard communicating via a wired or a wireless connection (e.g., a BLUETOOTH keyboard), an external mouse, etc.

In one aspect, software applications 344 may include an insurance claim application 346, which may be implemented as a series of machine-readable instructions for executing one or more functions described herein. In another aspect, insurance claim application 346 may cooperate with one or more other hardware or software components of mobile computing device 300 to perform these functions.

For example, insurance claim application 346 may include various instructions for facilitating reporting or otherwise communicating information to an insurer, which may be used by the insurer for various insurance-related purposes and are further discussed below with reference to FIG. 4. In one aspect, when launching insurance claim application 346, a user may enter logon credentials which may be verified by one or more external computing devices, servers, etc. (e.g., one or more of external computing devices 160.1-160.M). These logon credentials may be associated with insurer profile data, such as insurance policy numbers, vehicles insured, vehicle identification numbers of insured vehicles, contact information, premium rates, discounts, etc. In this way, communications from mobile computing device 300 allow central monitoring system 150 and/or one or more of external computing devices 160.1-160.M to uniquely identify the insured customer so that any data collected, such as data collected via mobile computing device 300 and/or via one or more UAVs 102.1-102.N, may be saved and later referenced to the insurance customer and/or any insurance policies associated with that customer.

For example, insurance claim application 346 may facilitate the determination of a geographic location of mobile computing device 300 (e.g., via communications with location acquisition unit 320) and communicate this information to one or more of central monitoring system 150, one or more of UAVs 102.1-102.N, and/or one or more of external computing devices 160.1-160.M. To provide additional examples, insurance claim application 346 may facilitate instructions and/or prompts being displayed via display 316 guiding a user to collect data associated with a vehicle collision or crash (e.g., images of vehicles, vehicle license plates, driver's licenses, interview answers, etc.).

To provide an additional example, insurance claim application 346 may facilitate a user requesting one or more UAVs 102.1-102.N to the scene of the vehicle collision or crash, which may be specified, for example, by the geographic location of mobile computing device 300. In accordance with various embodiments, a user may utilize mobile computing device 300 to request one or more of UAVs 102.1-102.N via communications with a UAV 102.1-102.N, by sending a request to one or more of central monitoring system 150, and/or by sending a request to one or more of external computing devices 160.1-160.M. One or more of central monitoring system 150 and/or one or more of external computing devices 160.1-160.M may process these requests manually, automatically, or semi-automatically to dispatch one or more UAVs 102.1-102.N to the requested scene of the vehicle collision or crash.

To provide yet another example, insurance claim application 346 may facilitate a user requesting one or more UAVs 102.1-102.N after a vehicle collision or crash has already occurred. These aspects may be particularly useful when the vehicle collision or crash is minor and those involved can drive their vehicles away from the scene of the vehicle collision or crash. In such a scenario, one or more users involved in the vehicle collision or crash may request one or more UAVs 102.1-102.N to a desired location using their respective mobile computing devices. These locations may be specified via geographic coordinates, for example, and may be associated with a user's home, work, etc. Again, one or more of central monitoring system 150 and/or one or more of external computing devices 160.1-160.M may process requests from mobile computing device 300 manually, automatically, or semi-automatically to dispatch one or more UAVs 102.1-102.N to the requested location to collect the desired data.

Regardless of the location that one or more of UAVs 102.1-102.N are requested, in some aspects, insurance claim application 346 may facilitate communications between mobile computing device 300 and one or more of central monitoring system 150, one or more of UAVs 102.1-102.N, and/or one or more of external computing devices 160.1-160.M to receive an estimated time in which one or more UAVs 102.1-102.N may arrive at the scene of the vehicle collision or crash. This estimated time may be relayed to a user using any suitable techniques (e.g., via display 316).

Software applications 344 may include a web browser 348. In some aspects, web browser 348 may be a native web browser application, such as Apple's Safari®, Google Android™ mobile web browser, Microsoft Internet Explorer® for Mobile, Opera Mobile™, etc. In other embodiments, web browser 348 may be implemented as an embedded web browser. Regardless of the implementation of web browser 348, various aspects include web browser 348 being implemented as a series of machine-readable instructions for interpreting and displaying web page information received from one or more backend components. This web page information may be utilized in conjunction with insurance claim application 346 to perform one or more function of the aspects as described herein.

In one embodiment, software routines 352 may include a data collection routine 354, a UAV request routine 356, and/or a feedback routine 358. Data collection routine 354 may include instructions, that when executed by controller 340, facilitate the collection of audio, video, and/or image data associated with a vehicle collision or crash.

For example, data collection routine 354 may include instructions that, when executed by controller 340 in conjunction with insurance claim application 346, present a user with instructions and/or prompts to collect images, video, answer one or more predetermined interview questions prepared by an insurer, collect insurance claim form field data entered by a user, etc. In one aspect, data collection routine 354 may include instructions that, when executed by controller 340 in conjunction with insurance claim application 346, store the collected data as one or more data files in data storage 360 and/or cause the collected data to be transmitted via communication unit 330 to one or more external computing devices 160.1-160.M. External computing devices 160.1-160.M may use this data in addition to or as an alternative to the collected drone data to generate accident reconstruction and/or to perform various insurance-related tasks, which are further discussed below with reference to FIG. 4.

UAV request routine 356 may include instructions, that when executed by controller 340, facilitate the dispatching of one or more UAVs 102.1-102.N to a location specified by a user, which may be, for example the scene of a vehicle collision or crash, the user's home, work, etc. In one aspect, UAV request routine 356 may include instructions that, when executed by controller 340 in conjunction with insurance claim application 346, display one or more options to a user to request one or more UAVs 102.1-102.N, to determine and/or transmit the requested UAV delivery location, and/or to transmit the request via communication unit 330.

Feedback routine 358 may include instructions, that when executed by controller 340, support user interaction with mobile computing device 300. For example, controller 340 may execute instructions stored in feedback routine 358 to obtain information from a user and/or to provide the user with information received from one or more of UAVs 102.1-102.N, central monitoring system 150, and/or one or more of external computing devices 160.1-160.M, such as an estimated time of arrival for one or more requested UAVs 102.1-102N, for example. To provide another example, controller 340 may execute instructions stored in feedback routine 358 to display one or more prompts, to view insurance-related data such as insurer profile data, to view updates and/or the status of pending claims, to view updated insurance-related data such as new calculated insurance premiums, to view a virtual model of a reconstructed vehicle collision or crash, to view a calculated fault allocation, the status of an insurance claim process, the impact of a vehicle collision or crash on a user's insurance policy data, etc.

Although each of the components in FIG. 3 are illustrated as separate units or modules, any components integrated as part of mobile computing device 300 may be combined and/or share functions. For example, controller 340, GPU 318, and program memory 302 may be integrated as a single processing unit. Furthermore, although connections are not shown between the individual components of mobile computing device 300, mobile computing device 300 may implement any suitable number of wired and/or wireless links to facilitate communication and interoperability between these components.

For example, program memory 302, communication unit 330, and/or display 316 may be coupled via wired buses and/or wireless links to controller 340 and/or GPU 318 to facilitate communications between these components and/or to enable these components to accomplish their respective functions as described throughout the present disclosure. Furthermore, although FIG. 3 illustrates mobile computing device 300 having a single program memory 302, mobile computing device 300 may implement any suitable number and/or combination of memory systems.

Additionally, although FIG. 3 depicts controller 340 as including one program memory 302, one MP 306, and one RAM 308, controller 340 may include any suitable number of these components. Furthermore, although FIG. 3 depicts controller 340 as having a single I/O interface 310, controller 340 may include any suitable number and/or types of I/O interfaces 310. In various aspects, controller 340 may implement RAM(s) 308 and program memories 302 as any suitable type of memory, such as non-transitory computer readable memories, semiconductor memories, magnetically readable memories, and/or optically readable memories, for example.

IV. Exemplary External Computing Device

Figure 4:
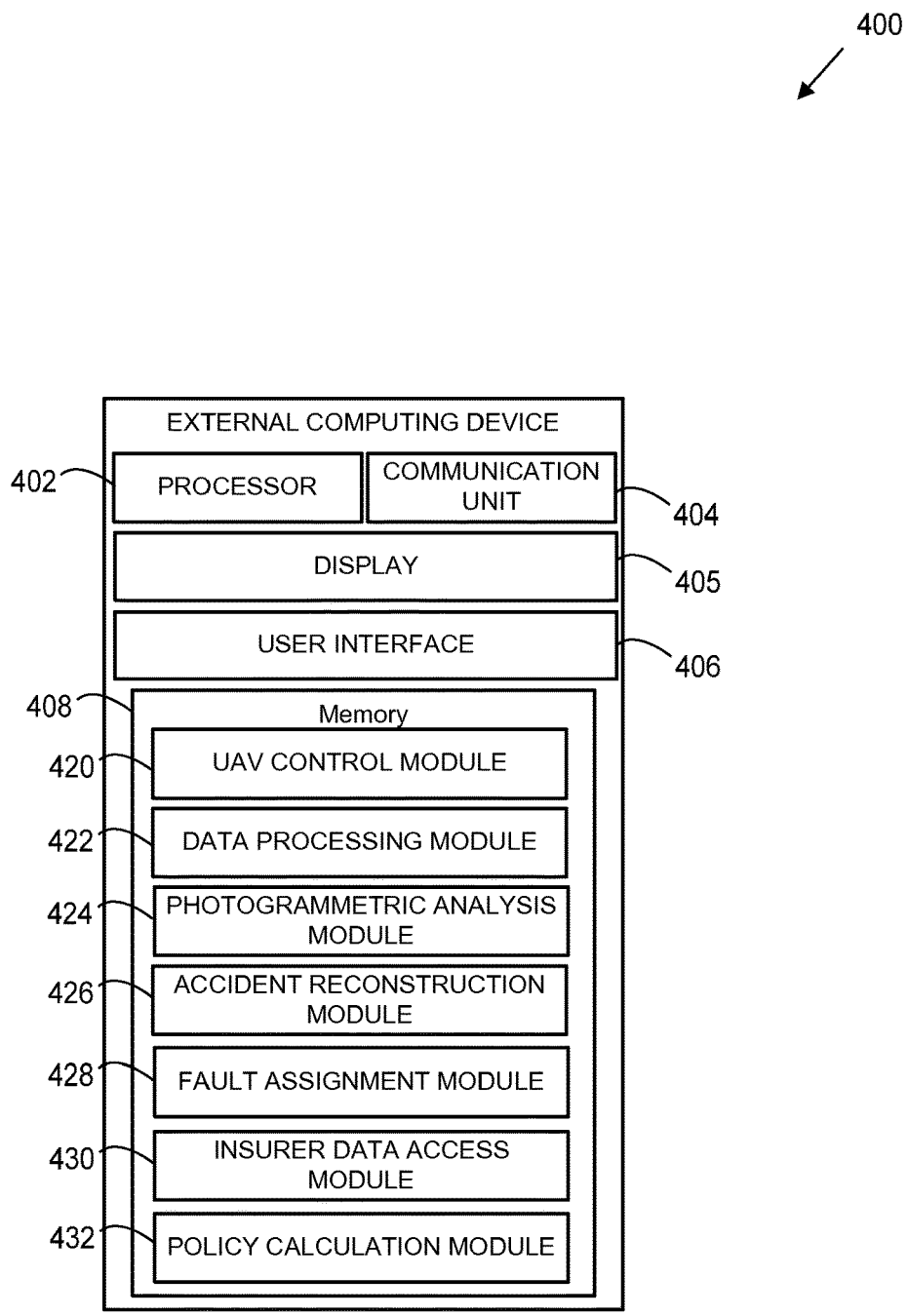
FIG. 4 illustrates an exemplary block diagram of an external computing device 400.

FIG. 4 illustrates an exemplary block diagram of an external computing device 400. External computing device 400 may be implemented as any suitable computing device. In various aspects, external computing device 400 may be an implementation of central monitoring system 150 or one or more of external computing devices 160.1-160.M, as shown in FIG. 1. External computing device 400 may include a processor 402, a communication unit 404, a display 405, a user interface 406, and a memory 408. External computing device 400 may include additional, fewer, or alternate components, including those discussed elsewhere herein.

Processor 402 may be implemented as any suitable type and/or number of processors, such as a host processor of external computing device 400, for example. To provide additional examples, processor 402 may be implemented as an application specific integrated circuit (ASIC), an embedded processor, a central processing unit (CPU) associated with external computing device 400, a graphical processing unit (GPU), etc.

Processor 402 may be configured to communicate with one or more of communication unit 404, display 405, user interface 406, and/or memory 408 via one or more wired and/or wireless interconnections, such as any suitable number of data and/or address buses, for example. These interconnections are not shown in FIG. 4 for purposes of brevity.

Processor 402 may be configured to operate in conjunction with one or more of communication unit 404, display 405, user interface 406, and/or memory 408 to process and/or analyze data, to store data to memory 408, to retrieve data from memory 408, and/or to perform one or more insurance-related functions. For example, processor 402 and communication unit 404 may facilitate receiving data from and/or sending data to one or more devices, such as central monitoring system 150, mobile computing device 200, one or more UAVs 102.1-102.N, etc.

Communication unit 404 may be configured to facilitate communications between external computing device 400 and one or more other devices. For example, in aspects in which external computing device 400 is an implementation of one or more of external computing devices 160.1-160.M, as shown in FIG. 1, communication unit 404 may facilitate communications between external computing device 400 and one or more UAVs 102.1-102.N, mobile computing device 190, and/or central monitoring system 150.

In various aspects, external computing device 400 may be configured to communicate with these other devices in accordance with any suitable number and type of communication protocols. Thus, in various aspects, communication unit 404 may be implemented with suitable hardware, firmware, and/or software to support any suitable number and type of communication protocols in accordance with the various aspects described herein.

Display 405 may be implemented as any suitable type of display and may facilitate user interaction with external computing device 400 in conjunction with user interface 406. For example, display 405 may be implemented as a capacitive touch screen display, a resistive touch screen display, etc. In various aspects, display 405 may be configured to work in conjunction with processor 402 and/or user interface 406 to display drone data received from one or more UAVs, to display data received from one or more mobile computing devices (e.g., requests for UAVs to be sent to the scene of a vehicle collision or crash), to display the result of various insurance-related calculations, to display the location of one or more UAV's, to display insurance profile data and/or other information associated with an insured person, to provide a graphical user interface (GUI) to facilitate the control and/or monitoring of one or more UAVs, etc.

User-interface 406 may be implemented as any suitable device configured to collect user input, such as a "soft" keyboard displayed on display 405, a keyboard attached to external computing device 400, an external keyboard communicating via a wired or a wireless connection (e.g., a BLUETOOTH keyboard), specialized joystick controls configured to control one or more UAVs, an external mouse, etc.

In various aspects, memory 408 may be implemented as a non-transitory tangible computer readable media configured to store computer-readable instructions, that when executed by processor 402, cause processor 402 to perform various acts. Program memory 408 may store one or more modules, which may be executed by processor 402 in conjunction with one or more other hardware or software components of external computing device 400 to facilitate the execution of one or more functions related to the various aspects, as further discussed below.

UAV control module 420 may include instructions to facilitate monitoring and/or controlling of one or more UAVs, such as UAVs 102.1-102.N, for example, as shown in FIG. 1. UAV control module may include instructions that, when executed by processor 402, enables processor 402 to process data sent by one or more UAVs, to identify one or more UAVs, to determine a status of one or more UAVs, and/or to transmit commands to one or more UAVs.

For example, processor 402 may receive periodic transmissions sent by one or more UAVs, and these transmissions may include a unique UAV identifier, a current geographic location of each UAV, a UAV status (e.g., en route to location, collecting data, charging and/or refueling, etc.), and/or a confirmation of receipt of a command sent to one or more UAVs. In some aspects, processor 402 may use this information to command one or more UAVs to navigate to a specific geographic location or to return to a predetermined "base" location, which may be used for refueling, recharging, and/or maintenance, for example.

In some aspects, a user may interact with external computing device 400 to perform control over one or more UAVs by, for example, watching video data and/or geographic location data received from one or more UAVs shown on display 405 and sending commands to one or more UAVs using this feedback. Information shown on display 405 for UAV control may include, for example, live video data, a map overlaid onto the UAV's current geographic location, etc.

In accordance with such aspects, processor 402 may execute instructions stored in UAV 402 to process controls received via user interface 406 (e.g., adjustments to altitude, speed, yaw, pitch, roll, direction, etc.), and convert these controls to data that is sent in a UAV control transmission, which may be transmitted via communication unit 404, for example.

When controlled by a user, external computing device 400 may function as a UAV dispatching center, receiving instructions to dispatch one or more UAVs and then navigating the one or more UAVs to the requested geographic locations, which may include the scene of a vehicle collision or crash or any other suitable location. For example, personnel trained to control UAVs may monitor communications received via communication unit 404, which may be forwarded from a call center (e.g., from a person involved in the vehicle collision or crash), received as a request sent via a mobile computing device, etc.

In other aspects, one or more UAVs may be controlled without (or with minimal) user intervention. In accordance with such aspects, external computing device 400 may function as a UAV dispatching center, but a person may not need to manually control one or more UAVs. For example, UAV requests may be received by external computing device 400 in an automated fashion, such as requests sent via a mobile computing device or via another Internet-enabled device, for example. In accordance with such aspects, these requests may include the geographic location of a requested UAV destination and/or details regarding the type of data to be collected upon the UAV reaching the destination.

In accordance with such aspects, processor 402 may execute instructions stored in UAV control module 420 to process these requests, determine a navigation route for one or more UAVs, and transmit the appropriate commands to one or more UAVs to ensure the UAV arrives at the requested geographic location. In various aspects, processor 402 may utilize live video data received from a UAV, weather conditions, and/or any other suitable data to safely guide the UAV to the requested location.

For example, processor 402 may execute instructions stored in UAV control module 420 analyze live video data received from a UAV in accordance with any suitable image recognition, object recognition, and/or machine vision algorithms to guide the UAV to a specific geographic location with little or no user intervention.

In some aspects, a UAV may be dispatched after a vehicle collision or crash has occurred, such as by one or more persons involved in the vehicle collision or crash using a mobile computing device, for example. But in other aspects, one or more UAVs may actively survey area to collect data prior to a vehicle collision or crash, and save and/or transmit this data as needed. These aspects may be particularly useful when specific intersections or other areas are associated with a high number of vehicle collision or crashes, such that one or more UAVs may monitor these areas in shifts to collect data at all times throughout the day, during rush hour, etc. The one or more UAVs may store collected drone data in a rolling buffer, periodically transmit collected drone data to an external computing device, etc.

Regardless of how external computing device 400 controls one or more UAVs, aspects include processor 402 executing instructions stored in UAV control module 420 to send one or more commands to one or more UAVs which, upon receiving by the commands, execute them to collect various types of data. For example, processor 402 may execute instructions stored in UAV 402 to send data in a UAV control transmission, which may be transmitted via communication unit 404, for example. This data may indicate specific commands which may be manually sent by a user and/or automatically sent upon a particular condition being satisfied, for example (e.g., the UAV arriving within a threshold distance of the destination).

The data collection commands may include any suitable command for the collection of drone data, such as recording audio, images, and/or video of the scene of a vehicle collision or crash, playing a prerecorded message requesting information from one or more persons associated with the vehicle collision or crash, initiating a video conference call between one or more persons associated with the scene of the vehicle collision or crash and an operator of external computing device 400, a command for a UAV to take aerial images and/or video data of the scene of a vehicle collision or crash, a command for a UAV to take various images (at different angles and distances) of the vehicles involved in the vehicle collision or crash, requesting the environmental conditions at the scene of the vehicle collision or crash, requesting details regarding the road conditions at the scene of a vehicle collision or crash, whether there was road construction, etc.

Data processing module 422 may include instructions to facilitate the collection of drone data from one or more UAVs, such as UAVs 102.1-102.N, for example, as shown in FIG. 1. Additionally or alternatively, data processing module 422 may include instructions to facilitate the collection of other sources of data, such as data received via one or more mobile computing devices and/or telematics data received from one or more vehicles, for example.

Data processing module 422 may include instructions that, when executed by processor 402, enable processor 402 to process drone data sent by one or more UAVs, to store the drone data in memory 408 and/or another suitable storage device (e.g., one or more databases in which external computing device 400 is connected), and/or to transmit the drone data to one or more other external computing devices.

For example, once a UAV is dispatched to the scene of a vehicle collision or crash or other location, the UAV may proceed to collect drone data, as previously discussed above with reference to execution of the instructions stored in UAV control module 420. For example, the drone data may include images and/or video captured above the scene of the vehicle collision or crash or from any suitable angle to facilitate accident reconstruction. These images and/or video data may provide, for example, images identifying the shape of the road, the type of intersection, the lighting conditions, the weather conditions, any skid marks at the scene of the vehicle collision or crash, the impact points associated with one or more vehicles involved in the vehicle collision or crash, the crush distance of any identified impact points, injured persons at the scene, the type and extent of any injuries, etc.

In various aspects, processor 402 may execute instructions stored in data processing module 422 to receive collected drone data from the one or more UAVs, to parse the data, and/or to correlate the data so that specific drone data may be later identified and associated with the particular type of data and/or vehicle to which it corresponds.

To provide an illustrative example, processor 402 may execute instructions stored in data processing module 422 to process live images, video, and/or audio data recorded by a UAV, which may include various types of information used to assess the fault of various parties or vehicles involved in a vehicle collision or crash. In one aspect, this video may be time-stamped by the UAV and/or by external computing device 400 to indicate when each command was sent and/or when each different type of data was recorded.

In this way, external computing device 400 may receive the data, parse the data, reference the timestamps to the commands sent, and label and/or store the parsed collected drone data in a way such that it may be identified. For example, drone data may include several interviews of different people, police officers, etc., along with several images of the scene of the vehicle collision or crash. Aspects include processor 402 executing instructions stored in data processing module 422 to separate these videos and store them with a suitable header, filename, label, etc., so that this data can be easily identified, accessed, read, viewed, processed, etc.

To provide another example, drone data may include aerial views of the scene of the vehicle collision or crash. Aspects include processor 402 executing instructions stored in data processing module 422 to reference compass data generated by the UAVs sensors to identify the orientation of the scene of the vehicle collision or crash with respect to the aerial images.

Additionally or alternatively, aspects include processor 402 executing instructions stored in data processing module 422 to determine an elevation from which the aerial images were taken above the surface of the roadway, which may be identified, for example, via elevation data included as part of the geographic coordinates generated by the UAV and transmitted as part of the collected drone data. The elevation data may also be calculated via an analysis of other sensor metrics measured by the UAV and included in the collected drone data, such as changes in barometric pressure between the road level and the elevation from which the aerial images were captured, for example.

In one aspect, processor 402 may execute instructions stored in data processing module 422 to perform any suitable object recognition techniques (e.g., edge detection) to identify lines corresponding to the road layout at the scene of the vehicle collision or crash. Processor 402 may use these identified lines and access one or more mapping databases (e.g., via communication unit 404) to match the lines to real world road contours and traffic directions. This road data and the accompanying reference locations, traffic directions, and/or elevation from the road may be stored in any suitable location locally (e.g., in a suitable portion of memory 408) or remotely (e.g., in one or more remote databases and/or another external computing device). This data may then be made available for accident reconstruction, which is further discussed below.

To provide another example, drone data may include various images of vehicles involved in a vehicle collision or crash. Aspects include processor 402 executing instructions stored in data processing module 422 to identify various details associated with each of these vehicles. For example, processor 402 may execute instructions stored in data processing module 422 to perform any suitable object recognition techniques to locate a license plate within one or more images. Processor 402 may extract the license plate number from the relevant location within one or more respective images using any suitable optical character recognition (OCR) techniques.

To provide another example, processor 402 may execute instructions stored in data processing module 422 to access one or more databases (e.g., via communication unit 404) having stored images of different vehicles. These images may include, for a single vehicle make, model, and year, several images of that vehicle at different angles, lighting conditions, colors, etc. Such databases may include several images of a large number (e.g., hundreds or thousands) of vehicles, as well as the size specifications associated with each of these vehicles. Processor 402 may further utilize sensor data included in the collected drone data to help facilitate this process by correlating lighting conditions and/or orientation, generated by the UAV sensor array, to images stored in the database having similar metrics.

Processor 402 may use instructions stored in data processing module 422 to compare the vehicle images to those in the collected drone data to identify the specific make, model, and year for each vehicle involved in a vehicle collision or crash. The data identifying each vehicle, which may be referenced to the license number for each vehicle so that each vehicle can be uniquely identified, may be stored in any suitable location locally (e.g., in a suitable portion of memory 408) or remotely (e.g., in one or more remote databases and/or another external computing device). This data may then be made available for accident reconstruction, which is further discussed below.

Photogrammetric analysis module 424 may include instructions to facilitate the calculation of one or more measurements utilizing the collected drone data and/or the data stored as a result of processor 402 executing instructions stored in data processing module 422, as previously discussed.

For example, processor 402 may execute instructions stored in photogrammetric analysis module 424 to measure road lane widths and/or to identify the size and shape of the road on which a vehicle collision or crash occurred. In various aspects, processor 402 may perform such calculations, for example, by utilizing elevation data associated with various aerial images included in the drone data and/or a known size of one or more reference objects located in the aerial images (e.g., U.S. interstate highway road lanes have a standardized width). In this way, processor 402 may measure the dimensions and shape of the road on which the vehicle collision or crash occurred. Processor 402 may store these measurements as a scaled road model locally or remotely for use in the accident reconstruction process, which is further explained below.

To provide another example, processor 402 may execute instructions stored in photogrammetric analysis module 424 to measure the size of one or more impact points, the structural crush depth associated with such impact points, the location of one or more impact points with respect to other areas of the vehicle (e.g., driver's side, front left side, etc.) the length of skid marks on the road, etc. In one aspect, processor 402 may use known reference lengths within the image to perform these calculations.

To provide an illustrative example, processor 402 may identify the make, model, and year of the vehicle via execution of instructions stored in data processing module 422, as discussed above. Once a vehicle is identified in this manner, the vehicle's size specifications may also be identified. In one aspect, processor 402 may use a known vehicle size dimension to determine the size of other dimensions within the image by determining a proportion between an unknown dimension and the known reference dimension, and calculating the unknown dimension accordingly. This data may then be stored in memory 408 or some other suitable location and made available for accident reconstruction, which is further discussed below.

That is, if an impact point on a vehicle takes up one-sixth of the front of a vehicle that is known to be 72" wide, the impact point dimension may be calculated as one-sixth of 72", or 12". This technique may be expanded to measure other dimensions such as structural crush depth (which may require multiple images to ascertain a maximum depth), the length of skid marks, etc.

To provide another illustrative example, the federal guidelines for every street, highway, and rural road in the United States, where dashed lines separate traffic lanes or indicate where passing is allowed, is mandated at 10 feet. Therefore, if the drone data includes images of an entire dashed road lane line, processor 402 may use this known reference dimension of 10 feet to measure other details in the images based upon the proportions between unknown measurements and the 10 foot reference.

Accident reconstruction module 426 may include instructions to facilitate the generation of a virtual reconstruction model of the vehicle collision or crash utilizing the collected drone data and/or the data stored as a result of processor 402 executing instructions stored in photogrammetric analysis module 424, as previously discussed.

That is, processor 402 may execute instructions stored in photogrammetric analysis module 424 to calculate, using the location, size, and structural crush depth of various impact points of vehicles involved in a vehicle collision or crash, the speed and direction of vehicles before, during, and after the vehicle collision or crash. Once this information is known, processor 402 may execute instructions stored in accident reconstruction module 426 to generate the virtual reconstruction model of the vehicle collision or crash by overlaying the movement of the vehicles onto their location on the generated road model.

To provide an illustrative example, as previously discussed, processor 402 may identify the make, model, and year of each vehicle involved in a vehicle collision or crash, and use this information to ascertain the size of various dimensions of each of the vehicles. Furthermore, processor 402 may correlate the final location of each of the vehicles (as identified in an aerial image, for example) to the road model, and use the calculated speed and direction of each vehicle prior to impact to reverse the direction of each vehicle involved in the accident from their final position to generate the complete accident reconstruction model. Because each vehicle may uniquely be identified (e.g., via license plate numbers) the accident reconstruction model may also include a unique label or other suitable identifier to differentiate the vehicles from one another.

In various aspects, the virtual reconstruction model of the vehicle collision or crash may include wireframes, three-dimensional models, and/or any suitable virtual construct to adequately display the details of the vehicle collision or crash as calculated from the collected drone data. For example, a user may play the virtual reconstruction model of the vehicle collision or crash as a movie clip, pausing and advancing the clip at any suitable speed so that fault may be adequately ascertained and allocated. The virtual reconstruction model of the vehicle collision or crash may be stored in any suitable portion of memory 408 or some other suitable location and made available for the allocation of fault, which is further discussed below.

In some aspects, the vehicle collision or crash reconstruction process may be further assisted via information that may be manually collected in addition to the drone data. For example, one or more persons may be interviewed, and their answers to interview questions may help narrow down the iterations and/or calculations used to generate the final accident reconstruction model.

In additional aspects, the vehicle collision or crash reconstruction process may be further assisted via surveillance data collected by one or more UAVs monitoring an area prior to when a vehicle collision or crash occurs. In accordance with such aspects, processor 402 may execute instructions stored in data processing module 422 to identify the geographic location and/or time of the vehicle collision or crash, and locate the relevant drone data so the details of the vehicle collision or crash may be analyzed.

In accordance with such aspects, processor 402 may execute instructions stored in accident reconstruction module 426 to utilize the collected drone data for the vehicle collision or crash and incorporate this data into the accident reconstruction model. This data may be particularly useful, for example, in determining traffic light patterns and/or whether one or more vehicles ran a red light.

In still additional aspects, the vehicle collision or crash reconstruction process may be further assisted and/or verified using vehicle telematics data. For example, one or more vehicles may transmit or otherwise communicate their respective telematics data, which may be collected by the vehicles themselves (e.g., from event data recorders) and/or from one or more devices located in the vehicles that are configured to measure such data (e.g., a mobile computing device).

In accordance with such aspects, processor 402 may execute instructions stored in data processing module 422 to receive telematics data, associate the telematics data with each vehicle involved in a vehicle collision or crash, and verify that the data calculated for the virtual reconstruction model of the vehicle collision or crash matches the telematics data (e.g., within some threshold). In this way, the accuracy and reliability of the virtual reconstruction model of the vehicle collision or crash may be improved.

Fault assignment module 428 may include instructions to facilitate the calculation of fault allocation for a vehicle collision or crash using the virtual reconstruction model of the vehicle collision or crash and/or other data associated with the vehicle collision or crash (e.g., drone data). Fault assignment module 428 may include instructions that, when executed by processor 402, enable processor 402 to allocate fault in accordance with any suitable number and/or type of fault allocation algorithms, calculations, manual review, etc., to store fault allocation data indicative of the fault allocation determination in memory 408 and/or another suitable storage device (e.g., one or more databases in which external computing device 400 is connected), and/or to transmit the fault allocation data to one or more other external computing devices.

In one aspect, the percentage fault allocated to various drivers (or the vehicles, such as autonomous or semi-autonomous vehicles) may be determined through an analysis of the virtual reconstruction model of the vehicle collision or crash. In some aspects, the analysis may be performed manually by an insurer viewing the virtual reconstruction model of the vehicle collision or crash. In accordance with aspects in which the virtual reconstruction model of the vehicle collision or crash is manually reviewed to allocate fault, insurance personnel may review the virtual reconstruction model of the vehicle collision or crash to determine a fault allocation (e.g., a percentage fault from a total of 100%) for each driver involved. For example, once the vehicle collision or crash reconstruction has been reviewed, an insurer may ascertain who is at the most fault or whether one or more parties are at equal fault.

To provide an illustrative example, insurance claim personnel may play a virtual reconstruction model of the vehicle collision or crash to view the vehicle collision or crash as it occurred in real time. This may include, for example, viewing the details associated with the vehicle collision or crash and witnessing one car pulling out in front of another that had the right of way. To provide another example, the reconstruction playback may reveal that one car was following too closely to another to avoid a rear-end collision, that one vehicle was driving recklessly, crossed a lane line marker illegally, was driving too fast for conditions (such as traffic, construction, or weather conditions), etc.

In other aspects, the virtual reconstruction model of the vehicle collision or crash may be analyzed in an automatic or semi-automatic manner to calculate fault allocation. In accordance with such aspects, fault assignment module 428 may include instructions that, when executed by processor 402, cause processor 402 to identify various acts, parameters, and/or decisions performed by one or more vehicles to allocate fault to vehicles involved in the vehicle collision or crash in accordance with an accident profile.

In one aspect, the accident profile may include any suitable number and/or type of various accident parameters that are combined and/or weighed to calculate an accident fault allocation for each driver. These accident parameters may include, for example, the speed of each vehicle, one or more driver actions such as running red lights or not stopping completely, the stopping distance of one or more vehicles, weather conditions, road conditions, the presence of road construction, traffic light patterns, ranges of telematics data metrics that correspond to various vehicle speeds, acceleration, braking, etc.

To provide an illustrative example, a virtual reconstruction model of the vehicle collision or crash may reveal that a first vehicle pulled out into traffic in front of a second vehicle. An accident profile may be stored in fault assignment module 428 for this type of vehicle collision or crash scenario, which involves two vehicles and one vehicle pulling out into the way of the other. Furthermore, for this specific accident profile, a score may be assigned to each identified potential act contributing to the vehicle collision or crash. These potential acts may include, for example, the speed of each vehicle prior to the vehicle collision or crash (e.g., 1 point of fault for each 5 mph in excess of the posted limit) and the distance between each of the vehicles when the first vehicle pulled out in front of the second vehicle (e.g., 1 point for every 10 feet below some threshold value).

Continuing this example, data for a virtual reconstruction model of the vehicle collision or crash may identify that the second vehicle was not driving in excess of the posted speed limit and that the first vehicle pulled out in front of the second vehicle when the second vehicle was within 100 feet of the first vehicle. Although any suitable threshold may be used for fault allocation scoring, the stopping distance of the second vehicle (e.g., 150 feet) may be utilized as one example of a fault allocation scoring threshold. The stopping distance of the second vehicle may be calculated, for example, using make and model information, weather conditions, etc. Because the second driver was not speeding, that driver would receive zero fault points. Thus, for the previously-described accident scenario, 100% fault may be allocated to the driver of the first vehicle.

But changing the facts in the previous example such that the virtual reconstruction model of the vehicle collision or crash indicates that the second vehicle was travelling 70 mph in a 55 mph zone, the second vehicle driver may receive 3 points of fault, while the driver of the first vehicle may receive one point of fault for every 10 foot increment below the stopping distance threshold (5 points). Thus, out of the total 8 points, the driver of the first vehicle would be allocated 62.5% fault (⅝), while the driver of the second vehicle would be allocated 37.5% fault (⅜).

Insurer data access module 430 may include instructions to facilitate external computing device 400 accessing, reading, storing, and/or updating insurer data. For example, an insurer may store insurance policy data associated with vehicles and/or persons insured, their policy information, policy numbers, profile data, current premium process, the name of persons insured and their contact information, vehicles insured, license plate numbers, registration information, a history of vehicle collision or crashes and/or citations, vehicle identification numbers of insured vehicles, discounts in which insured customers may be qualified for and/or currently taking advantage of, current open claims, a history of vehicle collisions or crashes and/or previous claims, etc. This insurance policy data may be stored across several external computing devices, on one or more databases and/or storage devices, etc.

In one aspect, processor 402 may execute instructions stored in insurer data access module 430 to facilitate accessing this data and/or manipulating this data. For example, an insured customer may report a vehicle collision or crash using her logon credentials, which may be used by external computing device 400 to access the insurer data for the insured customer in a secure manner. Once a vehicle collision or crash is reconstructed, processor 402 may associate the collected drone data and/or an allocation of fault for the insured customer with her insurance policy data on file, appending, storing, or otherwise referencing the collected drone data and/or fault allocation to the insured customer's insurance data.

In various aspects, some portions of the insurance data may be secured by the insurer as proprietary information, while other aspects of the insurance data may be made available to authorized users via the Internet (e.g., those providing the correct logon credentials). Processor 402 may execute instructions stored in insurer data access module 426 to allow parties access to insurance data in accordance with the appropriate level of access established by the insurer.

In some aspects, one or more portions of the insurance data may be utilized to assist in the accident reconstruction process. For example, the insurer data may include a make, model, and year of a vehicle that is insured under a particular policy, and may include additional data such as a license plate of that vehicle. In one aspect, processor 402 may execute instructions stored in data processing module 422 to reference portions of the insurer data to portions of the drone data (e.g., a license plate number, logon credentials, etc.). Processor 402 may utilize this information to narrow the number of vehicle match iterations otherwise required to determine the make, model, and year for one or more vehicles when reconstructing the vehicle collision or crash.

Policy calculation module 432 may include instructions to facilitate external computing device 400 calculating pricing related to one or more insurance policies based upon the percentage of fault assigned to the driver of the insured vehicle. For example, once a vehicle collision or crash has been reconstructed and the fault allocated to one or more vehicles and/or drivers of those vehicles, an insurer may calculate insurance pricing based upon the allocated fault.

In some instances, the pricing may not be changed unless the driver is allocated some threshold percentage of fault (e.g., 50%). These aspects may be particularly useful, for example, when the insurer uses an accident forgiveness policy that does not raise the premium rates for an insured customer when the driver is not found to be at fault for a vehicle collision or crash.

In one aspect, processor 402 may execute instructions stored in policy calculation module 432 to reassess and/or recalculate pricing related to one or more insurance policies based upon the percentage of fault assigned to the driver of the insured vehicle. This may include, for example, increasing premiums when the allocated fault is greater than 50%, disqualifying an insured customer from one or more discounts related to safe driving, etc. In one aspect, policy calculation module 432 may include instructions to facilitate the calculation of insurance pricing using any suitable techniques, which may include traditional techniques that utilize the collected drone data.

Processor 402 may execute instructions stored in insurer data access module 430 to update the insurance data with an updated insurance pricing. Further in accordance with such aspects, processor 402 may execute instructions stored in policy calculation module 432 to cause external computing device 400 to transmit the updated insurance pricing to a computing device (e.g., to mobile computing device 200 via communication unit 404).

In one aspect, the mobile computing device, upon receiving the updated insurance pricing data, may display the updated insurance pricing data related to the user's insurance policy. This may include, for example, an indication of updated premium pricing, lost discounts, an indication that pricing, discounts, etc., will remain unchanged as a result of the vehicle collision or crash, etc. In various aspects, the notification may be performed using any suitable techniques, such as sending an email, a text message, a push notification, etc., to the insured driver's mobile computing device, which may display the notification and/or the updated insurance policy information. In this way, an insurance customer may receive updates regarding the impact of a vehicle collision or crash on the insured customer's premiums, a loss of discounts, etc.

The aforementioned aspects discuss the determination of fault allocation for vehicle collision or crashes for vehicles being driven by a person. However, aspects also include similar processes being applied to determine a malfunction associated with autonomous or semi-autonomous vehicles, and thus the allocation of fault to such malfunctioning vehicles, or systems or equipment that provide for autonomous or semi-autonomous vehicle functionality.

V. Exemplary Method of Utilizing Drone Data

Figure 5:
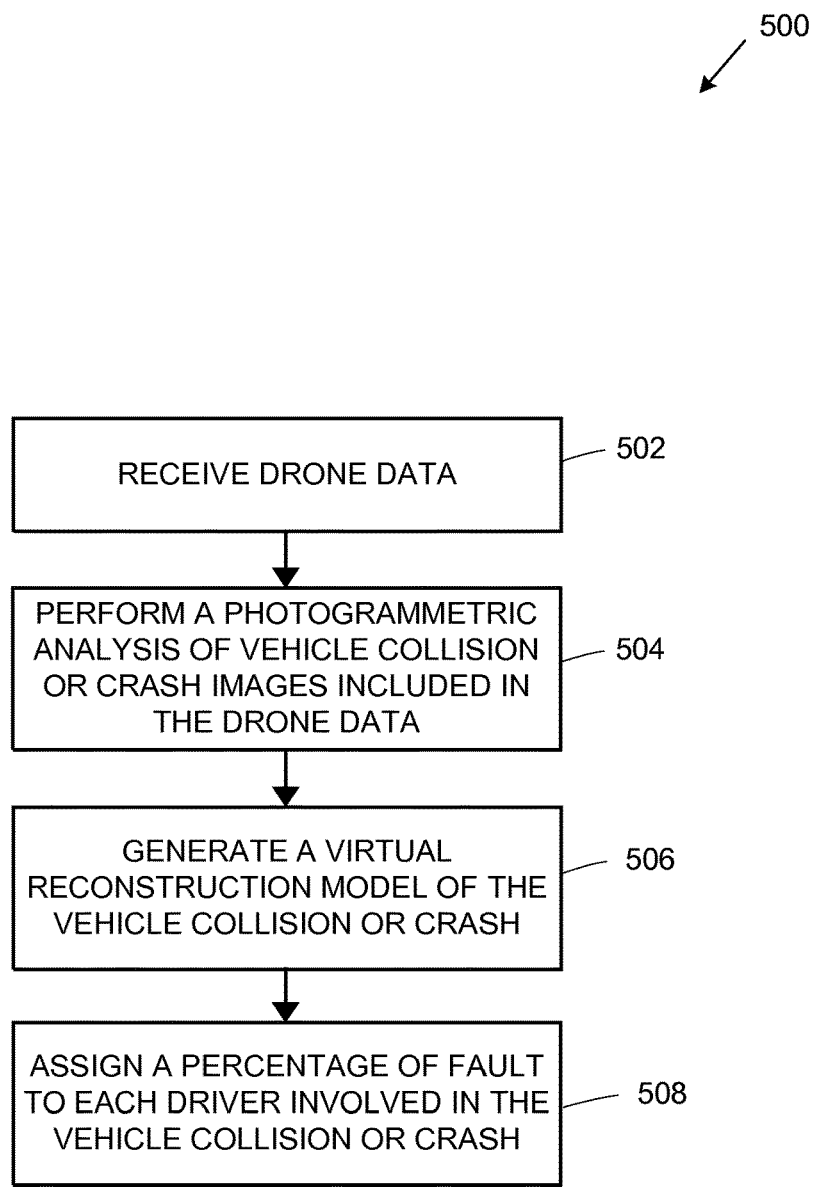
FIG. 5 illustrates an exemplary computer-implemented method 500.

FIG. 5 illustrates an exemplary computer-implemented method 500. In the present aspect, method 500 may be implemented by any suitable computing device (e.g., central monitoring system 150 and/or one or more of external computing devices 160.1-160.M, as shown in FIG. 1). In the present aspect, method 500 may be performed by one or more processors, applications, and/or routines, such as processor 402 executing instructions in one or more modules stored in non-transitory memory 408, for example, as shown in FIG. 4.

Method 500 may start when one or more processors receive drone data corresponding to a vehicle collision or crash (block 502). This may include, for example, receiving drone data collected from one or more UAVs dispatched to the scene of a vehicle collision or crash (block 502). The drone data may include, for example, images, video, audio, interview responses from persons associated with the vehicle collision or crash, weather data, aerial video footage, etc. (block 502).

Method 500 may include one or more processors performing a photogrammetric analysis of vehicle images include in the drone data (block 504). This may include, for example, an identification of one or more impact points and/or structural crush distances, as previously discussed with respect to FIG. 4 (block 504). In one aspect, method 500 may include the photogrammetric analysis of vehicle images resulting in the calculation of one or more metrics associated with the vehicle collision or crash, such as the speed and direction of vehicles before, during, and after the vehicle collision or crash (block 504).

Method 500 may include one or more processors generating a virtual reconstruction model of the vehicle collision or crash (block 506). This may include, for example, utilizing the collected drone data (block 502) and/or the results of the photogrammetric analysis (block 504) to construct wireframes, three-dimensional models, and/or any suitable virtual construct to adequately display the details of the vehicle collision or crash (block 506). For example, the virtual reconstruction model of the vehicle collision or crash may be played as a movie clip, allowing the user to pause and advance the clip at any suitable speed (block 506).

Method 500 may include one or more processors assigning a percentage of fault to each driver or vehicle (or equipment or computer systems providing autonomous or semi-autonomous vehicle functionality) associated with the vehicle collision or crash (block 508). This may include, for example, manual, automatic, and/or semi-automatic allocations based upon the virtual reconstruction model of the vehicle collision or crash, as previously discussed with reference to FIG. 4 (block 506).

VI. Additional Technical Advantages

In the various aspects described herein, UAV 200, mobile computing device 300, and/or external computing device 400 may facilitate dispatching one or more UAVs to a vehicle collision or crash, receiving collected drone data, generating a virtual reconstruction model of the vehicle collision or crash, and/or allocating fault to one or more vehicles and/or drivers using the virtual reconstruction model of the vehicle collision or crash. Additionally or alternatively, these aspects may provide other benefits relating to the technical operation of UAV 200, mobile computing device 300, external computing device 400, and/or the storage devices associated therewith.

For example, external computing device 400 may advantageously perform object recognition and/or OCR processes on image and/or video data to determine the make, model, and year of vehicles involved in a vehicle collision or crash. External computing device 400 may also identify one or more drivers based upon an identification of their respective vehicles, such as via identification of license plate numbers, for example. Thus, in accordance with such aspects, external computing device 400 may perform more efficiently by eliminating user error and decreasing the chances that accident reconstruction would otherwise be performed erroneously.

Furthermore, fault allocation may be based upon the generated accident reconstruction model. Thus, external computing device 400 may also provide benefits such as decreased network bandwidth, as less communication is required between the insurers and policy holders due to the increased chance of fault allocation being properly assigned. And due to this increased efficiency, external computing device 400 may also save power that would otherwise be utilized for the transmission and/or reception of additional insurance claim processing.

One or more UAVs may also be dispatched to the scene of a vehicle collision or crash to collect drone data in an autonomous or semi-autonomous fashion. In traditional insurance claim processing, a claims adjuster would ordinarily need to assess vehicle damage and allocate fault based upon the data available, which may include police reports, the location of the vehicle damage, etc. Using the collected drone data, the time-consuming process of manual claim adjustment may be largely or entirely eliminated. Therefore, the present aspects increase the speed and efficiency in which insurance claims may be processed.

In addition to the aforementioned technical advantages, the collected drone data described herein may further improve upon conventional virtual accident reconstruction and/or the photogrammetric analysis processes.

First, typical accident reconstruction processes may involve the photogrammetric analysis of photographs taken at the ground level (e.g., by a person), which therefore limits the photogrammetric analysis to features captured at that level. Conventional photogrammetric techniques may also be limited when the images include various obstructions, which are more likely to occur within images taken at the ground level. But in accordance with the aspects described herein, the collected drone data may include images taken from vantage points ordinarily not used in a photogrammetric analysis such as aerial views, for example. These types of vantage points not only decrease the chance of obstructions in the images subjected to the photogrammetric analysis, but also allows for a more thorough photogrammetric analysis via the utilization of an increased range of vantage points.

Second, typical accident reconstruction procedures may involve estimating the value of some variables so that the process may be completed. These estimates may be based upon typical variables occurring within certain types of crash or collision incidents, such as angles of impact, the speed of vehicles, the direction of vehicles, etc. Because errors in these estimates may impact the accuracy of the resulting virtual accident reconstruction model, it is desirable that these initial estimates are accurate as well. In accordance with the aspects described herein, the drone data may include telematics data from one or more vehicles involved in a vehicle collision or crash that is later constructed. By using the telematics data, the accident reconstruction process may be performed more accurately by (1) determining accurate initial variable estimates on which to base the accident reconstruction calculations, and (2) verifying that a generated virtual accident reconstruction includes variables (e.g., speed, acceleration, direction, etc.) that match the metrics included in the telematics data.

VII. Exemplary Accident Reconstruction

In one aspect, a computer-implemented method of vehicle collision or crash reconstruction using drone data may be provided. The method may include (1) receiving image, audio, and/or other drone data, at or via a remote server (and/or one or more remote processors) associated with an insurance provider, from one or more drones (or drone transceivers) via wireless communication or data transmission, the drone data received recording, showing, capturing, detailing, or otherwise being associated with a scene of a vehicle collision or crash and being generated, captured, collected, or gathered by the one or more drones (and/or associated drone sensors, cameras, imaging devices, audio or visual recording devices, and/or other drone-mounted electronic devices) before, during, and/or after the vehicle collision or crash, the vehicle collision or crash involving an insured driver or vehicle covered by an insurance policy issued by the insurance provider; (2) analyzing, at or via the remote server, the drone data received to determine a series of events that occurred before, during, and/or after the vehicle collision or crash; and/or (3) generating, at or via the remote server, a virtual simulation of the vehicle collision or crash from the analysis of the drone data and/or the series of events that occurred before, during, and/or after the vehicle collision or crash, the virtual simulation of the vehicle collision or crash created using the drone data facilitating a fault determination for the vehicle collision or crash. The method may include additional, fewer, or alternate actions, including those discussed elsewhere herein, and may be implemented via one or more local or remote processors, or via computer-executable instructions stored non-transitory computer-readable media or medium.

The method may include assigning, at or via the remote server, a percentage of fault to each driver or vehicle (including smart or autonomous vehicles) involved in the vehicle collision or crash, including the insured driver or vehicle, based upon the virtual simulation of the vehicle collision or crash and/or analysis of the drone data; and/or adjusting or updating, at or via the remote server, a premium, rate, reward, or discount for the insurance policy of the insured driver or vehicle based upon the percentage of fault of the vehicle collision or crash that is assigned to the insured driver and/or vehicle. The method may include generating a wireless communication, at or via the remote server, related to the adjusted or updated insurance policy;

and/or transmitting the wireless communication from the remote server to a mobile or other computing device of the insured driver or a smart vehicle controller for presentation of the adjusted or updated insurance policy to the insured driver or an owner of the insured vehicle.

The drone data may be used to determine a percentage of fault for (1) autonomous or semi-autonomous vehicles; (2) human drivers; (3) road conditions; (4) traffic conditions; (5) weather conditions; and/or (6) road construction. The virtual simulation of the vehicle collision or crash created from the drone data may depict each vehicle involved with the vehicle collision or crash and their respective direction of travel and/or speed before, during, and/or after the vehicle collision or crash.

VIII. Exemplary Method of Allocating Fault Using Accident Reconstruction

In another aspect, a computer-implemented method of vehicle collision or crash reconstruction using drone data is provided. This aspect may include one or more processors (1) receiving drone data via wireless communications; (2) performing a photogrammetric analysis of the vehicle collision or crash images; (3) generating a virtual reconstruction model of the vehicle collision or crash based upon the photogrammetric analysis of the vehicle collision or crash images; and (4) assigning a percentage of fault to each driver involved in the vehicle collision or crash based upon an analysis of the virtual reconstruction model of the vehicle collision or crash. The drone data may be generated by one or more drones and include vehicle collision or crash images of (i) vehicles involved in a vehicular collision or crash, and/or (ii) the scene of the vehicle collision or crash.

Furthermore, the aspect may include one or more processors calculating pricing related to an insurance policy for a driver of an insured vehicle involved in the vehicle collision or crash based upon the percentage of fault assigned to the driver of the insured vehicle. Additionally or alternatively, the method may include one or more processors transmitting the pricing related to the insurance policy for the driver of the insured vehicle involved in the vehicle collision or crash to a mobile computing device associated with the insured driver.

In addition, the act of performing the photogrammetric analysis of the vehicle collision or crash images may include one or more processors (1) identifying one or more impact points of vehicles involved in the vehicle collision or crash by analyzing the images of vehicles involved in the vehicular collision or crash; (2) measuring a structural crush distance for each of the one or more impact points for each of the vehicles; and/or (3) calculating a speed and direction of each of the vehicles involved in the vehicular collision or crash before, during, and after the vehicle collision or crash based upon a location of each of the one or more impact points and the structural crush distance for each of the vehicles involved in the vehicle collision or crash.

Furthermore, the act of generating the virtual reconstruction model of the vehicle collision or crash may include one or more processors generating the virtual reconstruction model of the vehicle collision or crash to indicate the calculated speed and direction of each of the vehicles involved in the vehicular collision or crash before, during, and after the vehicle collision or crash. The act of performing the photogrammetric analysis of the vehicle collision or crash images may include one or more processors generating a scaled road layout corresponding to the scene of the vehicle collision or crash by analyzing the images of the scene of the vehicle collision or crash.

The scaled road layout may be further used in the generation of the virtual reconstruction model of the vehicle collision or crash to indicate the calculated speed and direction of each of the vehicles involved in the vehicular collision or crash before, during, and after the vehicle collision or crash overlaid onto the scaled road layout. Additionally or alternatively, the method may include one or more processors receiving telematics data from one or more of the vehicles involved in the vehicular collision or crash, and verifying the virtual reconstruction model with the telematics data.

IX. Exemplary External Computing Device

In yet another aspect, an external computing device is provided that may be associated with an insurance provider. The external computing device may include a communication unit configured to receive drone data via wireless communications. The drone data may be, for example, generated by one or more drones and include vehicle collision or crash images of (i) vehicles involved in a vehicular collision or crash, and (ii) a scene of the vehicle collision or crash.

The external computing device may also include a processor configured to (1) perform a photogrammetric analysis of the vehicle collision or crash images; (2) generate a virtual reconstruction model of the vehicle collision or crash based upon the photogrammetric analysis of the vehicle collision or crash images; and (3) assign a percentage of fault to each driver involved in the vehicle collision or crash based upon an analysis of the virtual reconstruction model of the vehicle collision or crash.

Additionally or alternatively, the processor may be configured to calculate pricing related to an insurance policy for a driver of an insured vehicle involved in the vehicle collision or crash based upon the percentage of fault assigned to the driver of the insured vehicle. The communication unit may also be further configured to transmit the pricing related to the insurance policy for the driver of the insured vehicle involved in the vehicle collision or crash to a mobile computing device associated with the insured driver.

The processor may also be additionally configured to perform the photogrammetric analysis of the vehicle collision or crash images to (i) identify one or more impact points of vehicles involved in the vehicle collision or crash by analyzing the images of vehicles involved in the vehicular collision or crash, (ii) measure a structural crush distance for each of the one or more impact points for each of the vehicles, and/or (iii) calculate a speed and direction of each of the vehicles involved in the vehicular collision or crash before, during, and after the vehicle collision or crash based upon a location of each of the one or more impact points and the structural crush distance for each of the vehicles involved in the vehicle collision or crash. Additionally or alternatively, the processor may be configured to generate the virtual reconstruction model of the vehicle collision or crash to indicate the calculated speed and direction of each of the vehicles involved in the vehicular collision or crash before, during, and after the vehicle collision or crash.

Furthermore, the processor may be further configured to perform the photogrammetric analysis of the vehicle collision or crash images to (i) generate a scaled road layout corresponding to the scene of the vehicle collision or crash by analyzing the images of the scene of the vehicle collision or crash, and/or (ii) generate the virtual reconstruction model of the vehicle collision or crash to indicate the calculated speed and direction of each of the vehicles involved in the vehicular collision or crash before, during, and after the vehicle collision or crash overlaid onto the scaled road layout. Additionally or alternatively, the communication unit may be further configured to receive telematics data from one or more of the vehicles involved in the vehicular collision or crash, and the processor may be further configured to verify the virtual reconstruction model with the telematics data.

X. Exemplary Non-Transitory Computer Readable Media

In yet another aspect, a non-transitory computer readable media having instructions stored thereon is provided that, when executed by a processor, cause the processor to: (1) receive drone data via wireless communications; (2) perform a photogrammetric analysis of the vehicle collision or crash images; (3) generate a virtual reconstruction model of the vehicle collision or crash based upon the photogrammetric analysis of the vehicle collision or crash images; and/or (4) assign a percentage of fault to each driver involved in the vehicle collision or crash based upon an analysis of the virtual reconstruction model of the vehicle collision or crash. The drone data may be generated by one or more drones and include vehicle collision or crash images of (i) vehicles involved in a vehicular collision or crash, and/or (ii) the scene of the vehicle collision or crash.

Additionally or alternatively, the non-transitory computer readable media may include instructions that, when executed by the processor, cause the processor to calculate pricing related to an insurance policy for a driver of an insured vehicle involved in the vehicle collision or crash based upon the percentage of fault assigned to the driver of the insured vehicle. The non-transitory computer readable media may also include instructions that, when executed by the processor, cause the processor to transmit the pricing related to the insurance policy for the driver of the insured vehicle involved in the vehicle collision or crash to a mobile computing device associated with the insured driver.

The non-transitory computer readable media may also include instructions that, when executed by the processor, cause the processor to perform the photogrammetric analysis of the vehicle collision or crash images to (i) identify one or more impact points of vehicles involved in the vehicle collision or crash by analyzing the images of vehicles involved in the vehicular collision or crash, (ii) measure a structural crush distance for each of the one or more impact points for each of the vehicles, and/or (iii) calculate a speed and direction of each of the vehicles involved in the vehicular collision or crash before, during, and after the vehicle collision or crash based upon a location of each of the one or more impact points and the structural crush distance for each of the vehicles involved in the vehicle collision or crash. Additionally or alternatively, the non-transitory computer readable media may include instructions that, when executed by the processor, cause the processor to generate the virtual reconstruction model of the vehicle collision or crash to indicate the calculated speed and direction of each of the vehicles involved in the vehicular collision or crash before, during, and after the vehicle collision or crash.

Furthermore, the non-transitory computer readable media may include instructions that, when executed by the processor, cause the processor to perform the photogrammetric analysis of the vehicle collision or crash images to (i) generate a scaled road layout corresponding to the scene of the vehicle collision or crash by analyzing the images of the scene of the vehicle collision or crash, and/or (ii) generate the virtual reconstruction model of the vehicle collision or crash to indicate the calculated speed and direction of each of the vehicles involved in the vehicle collision or crash before, during, and after the vehicle collision or crash overlaid onto the scaled road layout. Additionally or alternatively, the non-transitory computer readable media may include instructions that, when executed by the processor, cause the processor to receive telematics data from one or more of the vehicles involved in the vehicular vehicle collision or crash, and to verify the virtual reconstruction model with the telematics data.

XI. Additional Considerations

UAVs are described throughout the disclosure as being dispatched, deployed, or otherwise instructed to travel to one or more locations to perform various functions. As will be appreciated by those of ordinary skill in the relevant art(s), UAVs may be instructed to navigate to a specific location via any suitable techniques, such as referencing a postal address, a landmark, a location received in terms of latitude and longitude coordinates, etc. When a UAV is instructed to navigate to a geographic location and/or to perform various functions associated with a geographic location, the geographic location may defined in any suitable manner, such as a geofenced coordinate boundary, for example. Regardless of the specific purpose of the information collected by a UAV as further provided below, a UAV may receive instructions, collect information, execute various actions, store information, and/or transmit collected information in any suitable manner.

Furthermore, throughout the disclosure, functions to be performed by one or more UAVs may be explained as being performed by a single UAV, such as UAV 200, for example, for purposes of brevity. In the aspects described herein, any described aspects may be performed by a single UAV or any suitable number of additional UAVs. The number of UAVs used to collect data may be based upon the size of the vehicle collision or crash, the number of vehicles involved, the time-sensitive nature regarding when the data needs to be collected, etc.

In some aspects, the various UAV functions may be performed by UAVs maneuvering with or without a tethered system. For example, in some aspects, one or more UAVs may fly untethered to carryout various functions. In other aspects, however, one or more UAVs may utilize a tethering system while flying (or other means of locomotion) within a radius governed by the length of the tether. Such tethering systems may be particularly useful, for example, when higher power requirements are required, such that one or more UAVs may receive power via the tether instead of draining their respective internal batteries. UAV 200 may include additional, fewer, or alternate actions, including those discussed elsewhere herein.

With the foregoing, an insurance customer may opt into a rewards, insurance discount, or other type of program. After the insurance customer provides their affirmative consent, an insurance provider drone or UAV may collect image data of insured assets before (and/or after) an insurance-related event, including those events discussed elsewhere herein. For instance, drone data may be collected before, during, and/or after a vehicle collision or crash, such as with the insured's permission. In return, risk averse drivers and/or vehicle owners (such as owners or autonomous or semi-autonomous vehicles with safety features or technology) may not be unfairly penalized for vehicle collisions or crashes that were not their fault, but rather were caused by another vehicle or driver.

In one aspect, drone or UAV data, and/or other data, including the types of data discussed elsewhere herein, may be collected or received by an insurance provider remote server, such as via direct or indirect wireless communication or data transmission from a drone or UAV, after a customer affirmatively consents or otherwise opts into an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as vehicles, and/or (ii) vehicle operators or passengers.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims. Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain aspects are described herein as including logic or a number of components or modules. Modules may constitute either software modules (e.g., code stored on a machine-readable medium) or hardware modules. A hardware module is tangible unit capable of performing certain operations and may be configured or arranged in a certain manner. In example aspects, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In some cases, a hardware module may include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or temporarily configured circuitry (e.g., configured by software) may be driven by cost/time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering aspects in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In aspects in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example aspects, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example aspects, the processor or processors may be located in a single location (e.g., within a home environment, an office environment or as a server farm), while in other aspects the processors may be distributed across a number of locations.

The one or more processors may also operate to support performance of the relevant operations in a "cloud computing" environment or as a SaaS. For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example aspects, the one or more processors or processor-implemented modules may be located in a single geographic location (e.g., within a home environment, an office environment, or a server farm). In other example aspects, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one aspect" or "an aspect" means that a particular element, feature, structure, or characteristic described in connection with the aspect is included in at least one aspect. The appearances of the phrase "in one aspect" in various places in the specification are not necessarily all referring to the same aspect.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

Upon reading this disclosure, those of skill in the art will appreciate still additional alternative structural and functional designs for executing actions with one or more UAVs, collecting information via one or more UAVs, and/or and utilizing this collected information through the disclosed principles herein. Thus, while particular aspects and applications have been illustrated and described, it is to be understood that the disclosed aspects are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

This detailed description is to be construed as exemplary only and does not describe every possible embodiment, as describing every possible embodiment would be impractical, if not impossible. One may be implement numerous alternate embodiments, using either current technology or technology developed after the filing date of this application.

What is claimed is:

1. A computer-implemented method of vehicle collision or crash reconstruction using drone data, comprising:
    receiving, by one or more processors, drone data via wireless communications, the drone data being generated by one or more drones and including vehicle collision or crash images of (i) vehicles involved in a vehicular collision or crash, and (ii) a scene of the vehicle collision or crash,
    performing, by one or more processors, a photogrammetric analysis of the vehicle collision or crash images, the photogrammetric analysis including calculating respective speeds and respective directions of the vehicles before, during, and after the vehicle collision or crash;
    generating, by one or more processors, a virtual accident reconstruction model of the vehicle collision or crash based upon the photogrammetric analysis of the vehicle collision or crash images, the virtual accident reconstruction model generated by overlaying respective movements of the vehicles, as indicated by the respective speeds and respective directions of the vehicles before, during, and after the vehicle collision or crash, onto respective locations of a model of a road on which the vehicle crash or collision occurred; and
    assigning, by one or more processors, a percentage of fault to each driver and vehicle involved in the vehicle collision or crash based upon an analysis of the virtual accident reconstruction model of the vehicle collision or crash.

2. The computer-implemented method of claim 1, further comprising:
calculating, by one or more processors, pricing related to an insurance policy for a driver of an insured vehicle involved in the vehicle collision or crash based upon the percentage of fault assigned to the driver of the insured vehicle, or to the insured vehicle.

3. The computer-implemented method of claim 2, further comprising:
transmitting, by one or more processors, the pricing related to the insurance policy for the driver of the insured vehicle involved in the vehicle collision or crash to a mobile computing device associated with the insured driver.

4. The computer-implemented method of claim 1, wherein calculating the respective speeds and the respective directions of the vehicles before, during, and after the vehicle collision or crash further comprises:
identifying, by one or more processors, respective one or more impact points of each of the vehicles by analyzing the vehicle collision or crash images of the vehicles involved in the vehicular collision or crash;
measuring, by one or more processors, a respective structural crush distance of each of the respective one or more impact points of each of the vehicles; and
calculating, by one or more processors, a respective speed and a respective direction of each of the vehicles before, during, and after the vehicle collision or crash based upon a respective location and the respective structural crush distance of each of the respective one or more impact points of each of the vehicles.

5. The computer-implemented method of claim 1, wherein the model of the road comprises:
a scaled road layout corresponding to the scene of the vehicle collision or crash, the scaled road layout generated by analyzing the images of the scene of the vehicle collision or crash.

6. The computer-implemented method of claim 1, further comprising:
receiving, by one or more processors, telematics data from one or more of the vehicles involved in the vehicular collision or crash; and
verifying, by one or more processors, the virtual accident reconstruction model with the telematics data.

7. The computer-implemented method of claim 1, wherein drone data further comprises:
surveillance data collected of the scene prior to the vehicle collision or crash.

8. An external computing device associated with an insurance provider, comprising:
a communication unit configured to receive drone data via wireless communications,
wherein the drone data is generated by one or more drones and includes vehicle collision or crash images of (i) vehicles involved in a vehicular collision or crash, and (ii) a scene of the vehicle collision or crash; and
a processor configured to:
perform a photogrammetric analysis of the vehicle collision or crash images, the photogrammetric analysis including calculating respective speeds and respective directions of the vehicles before, during, and after the vehicle collision or crash;
generate a virtual accident reconstruction model of the vehicle collision or crash based upon the photogrammetric analysis of the vehicle collision or crash images, the virtual accident reconstruction model generated by overlaying respective movements of the vehicles, as indicated by the respective speeds and respective directions of the vehicles before, during, and after the vehicle collision or crash, onto respective locations of a model of a road on which the vehicle crash or collision occurred; and
assigning a percentage of fault to each driver involved in the vehicle collision or crash based upon an analysis of the virtual accident reconstruction model of the vehicle collision or crash.

9. The external computing device of claim 8, wherein the processor is further configured to calculate pricing related to an insurance policy for a driver of an insured vehicle involved in the vehicle collision or crash based upon the percentage of fault assigned to the driver of the insured vehicle.

10. The external computing device of claim 9, wherein the communication unit is further configured to transmit the pricing related to the insurance policy for the driver of the insured vehicle involved in the vehicle collision or crash to a mobile computing device associated with the insured driver.

11. The external computing device of 8, wherein the calculation of the respective speeds and the respective directions of the vehicles before, during, and after the vehicle collision or crash includes (i) a respective identification of a respective one or more impact points of each of the vehicles by analyzing the images of the vehicles involved in the vehicular collision or crash, (ii) a respective measurement of a respective structural crush distance of each of the respective one or more impact points of each of the vehicles, and (iii) the respective speed and the respective direction of each of the vehicles before, during, and after the vehicle collision or crash based upon a respective location and the respective structural crush distance of each of the respective one or more impact points of each of the vehicles.

12. The external computing device of claim 8, wherein the model of the road comprises:
a scaled road layout corresponding to the scene of the vehicle collision or crash, the scaled road layout generated by analyzing the images of the scene of the vehicle collision or crash.

13. The external computing device of claim 8, wherein the communication unit is further configured to receive telematics data from one or more of the vehicles involved in the vehicular collision or crash, and
wherein the processor is further configured to verify the virtual accident reconstruction model with the telematics data.

14. The external computing device of claim 8, wherein drone data further comprises:
surveillance data collected of the scene prior to the vehicle collision or crash.

15. A non-transitory computer readable media having instructions stored thereon that, when executed by a processor, cause the processor to:
receive drone data via wireless communications, the drone data being generated by one or more drones and including vehicle collision or crash images of (i) vehicles involved in a vehicular collision or crash, and (ii) a scene of the vehicle collision or crash;
perform a photogrammetric analysis of the vehicle collision or crash images to thereby calculate respective speeds and respective directions of the vehicles before, during, and after the vehicle collision or crash;

generate a virtual accident reconstruction model of the vehicle collision or crash based upon the photogrammetric analysis of the vehicle collision or crash images, the virtual accident reconstruction model generated by overlaying respective movements of the vehicles, as indicated by the respective speeds and respective directions of the vehicles before, during, and after the vehicle collision or crash, onto respective locations of a model of a road on which the vehicle crash or collision occurred; and assigning a percentage of fault to each driver involved in the vehicle collision or crash based upon an analysis of the virtual accident reconstruction model of the vehicle collision or crash.

16. The non-transitory computer readable media of claim 15, further including instructions that, when executed by the processor, cause the processor to calculate pricing related to an insurance policy for a driver of an insured vehicle involved in the vehicle collision or crash based upon the percentage of fault assigned to the driver of the insured vehicle.

17. The non-transitory computer readable media of claim 16, further including instructions that, when executed by the processor, cause the processor to transmit the pricing related to the insurance policy for the driver of the insured vehicle involved in the vehicle collision or crash to a mobile computing device associated with the insured driver.

18. The non-transitory computer readable media of claim 15, wherein the instructions to perform the photogrammetric analysis of the vehicle collision or crash image to thereby calculate the respective speeds and the respective direction of the vehicles before, during, and after the vehicle collision or crash include instructions that, when executed by the processor, cause the processor to (i) identify respective one or more impact points of each of the vehicles by analyzing the images of the vehicles involved in the vehicular collision or crash, (ii) measure a respective structural crush distance of each of the respective one or more impact points of each of the vehicles, and (iii) calculate a respective speed and a respective direction of each of the vehicles before, during, and after the vehicle collision or crash based upon a respective location and the respective structural crush distance of each of the one or more impact points of each of the vehicles.

19. The non-transitory computer readable media of claim 15, wherein the model of the road comprises a scaled road layout corresponding to the scene of the vehicle collision or crash, the scaled road layout generated by analyzing the images of the scene of the vehicle collision or crash.

20. The non-transitory computer readable media of claim 15, further including instructions that, when executed by the processor, cause the processor to (i) receive telematics data from one or more of the vehicles involved in the vehicular collision or crash, and (ii) verify the virtual accident reconstruction model with the telematics data.

21. The non-transitory computer readable media of claim 15, wherein drone data further comprises:

surveillance data collected of the scene prior to the vehicle collision or crash.

* * * * *